United States Patent
Nixon et al.

(10) Patent No.: US 9,772,623 B2
(45) Date of Patent: Sep. 26, 2017

(54) SECURING DEVICES TO PROCESS CONTROL SYSTEMS

(71) Applicant: FISHER-ROSEMOUNT SYSTEMS, INC., Round Rock, TX (US)

(72) Inventors: Mark J. Nixon, Round Rock, TX (US); Ken J. Beoughter, Round Rock, TX (US); Daniel D. Christensen, Austin, TX (US); Deji Chen, Travis, TX (US); James H. Moore, Jr., Georgetown, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 15/212,399

(22) Filed: Jul. 18, 2016

(65) Prior Publication Data
US 2016/0327942 A1    Nov. 10, 2016

Related U.S. Application Data

(62) Division of application No. 14/456,763, filed on Aug. 11, 2014, now Pat. No. 9,397,836.

(51) Int. Cl.
*H04L 29/06* (2006.01)
*G05B 19/418* (2006.01)
(Continued)

(52) U.S. Cl.
CPC ..... *G05B 19/41855* (2013.01); *G05B 19/418* (2013.01); *H04L 9/0869* (2013.01);
(Continued)

(58) Field of Classification Search
CPC ....... G05B 19/418; H04L 9/32; H04L 9/0869; H04L 63/08; G06F 21/602; G06F 21/606; G06F 21/80; G06F 21/62; G06F 21/64
(Continued)

(56) References Cited

U.S. PATENT DOCUMENTS 4,593,367 A    6/1986    Slack et al.
5,111,531 A    5/1992    Grayson et al.
(Continued)

FOREIGN PATENT DOCUMENTS

AU    2010257310 A1    7/2012
CN    102710861 A    10/2012
(Continued)

OTHER PUBLICATIONS

Sailer, Reiner, et al. "Attestation-based policy enforcement for remote access." Proceedings of the 11th ACM conference on Computer and communications security. ACM, 2004.*
(Continued)

*Primary Examiner* — Syed Zaidi
(74) *Attorney, Agent, or Firm* — Marshall, Gerstein & Borun LLP

(57) ABSTRACT

Techniques for securing a device for use in or with a process plant include provisioning the device with a key generated at least in part from data indicative of necessary conditions and/or attributes that must be met before the device is allowed access to a network of the process plant. Upon initialization, the device determines, based on the key, whether or not the necessary conditions are met, and the device isolates itself or accesses the process control network accordingly. Keys and the necessary conditions/attributes indicated therein may be based on, for example, location, time, context, customer, supplier, particular plant, manufacturer, user, data type, device type, and/or other criteria. Additionally, sub-keys associated with a key may be generated from another set of necessary conditions/attributes. Sub-keys may be provided by a different entity than the key provider entity.

25 Claims, 8 Drawing Sheets

(51) Int. Cl.
*H04L 9/32* (2006.01)
*H04L 9/08* (2006.01)

(52) U.S. Cl.
CPC .............. *H04L 9/0872* (2013.01); *H04L 9/32* (2013.01); *H04L 9/3226* (2013.01); *G05B 2219/24167* (2013.01)

(58) Field of Classification Search
USPC ...................................................... 713/168
See application file for complete search history.

(56) References Cited

U.S. PATENT DOCUMENTS

| | | | |
|---|---|---|---|
| 5,598,572 A | 1/1997 | Tanikoshi et al. | |
| 5,801,942 A | 9/1998 | Nixon et al. | |
| 5,801,946 A | 9/1998 | Nissen et al. | |
| 5,828,851 A | 10/1998 | Nixon et al. | |
| 5,838,563 A | 11/1998 | Dove et al. | |
| 5,862,052 A | 1/1999 | Nixon et al. | |
| 5,862,054 A | 1/1999 | Li | |
| 5,909,368 A | 6/1999 | Nixon et al. | |
| 5,940,294 A | 8/1999 | Dove | |
| 5,980,078 A | 11/1999 | Krivoshein et al. | |
| 5,988,847 A | 11/1999 | McLaughlin et al. | |
| 5,995,916 A | 11/1999 | Nixon et al. | |
| 6,032,208 A | 2/2000 | Nixon et al. | |
| 6,078,320 A | 6/2000 | Dove et al. | |
| 6,098,116 A | 8/2000 | Nixon et al. | |
| 6,167,464 A | 12/2000 | Kretschmann | |
| 6,178,504 B1 | 1/2001 | Fieres et al. | |
| 6,195,591 B1 | 2/2001 | Nixon et al. | |
| 6,266,726 B1 | 7/2001 | Nixon et al. | |
| 6,285,966 B1 | 9/2001 | Brown et al. | |
| 6,295,513 B1 | 9/2001 | Thackston | |
| 6,324,877 B2 | 12/2001 | Neeley | |
| 6,421,570 B1 | 7/2002 | McLaughlin et al. | |
| 6,463,352 B1 | 10/2002 | Tadokoro et al. | |
| 6,535,883 B1 | 3/2003 | Lee et al. | |
| 6,563,430 B1 | 5/2003 | Kemink et al. | |
| 6,658,114 B1 | 12/2003 | Farn et al. | |
| 6,701,285 B2 | 3/2004 | Salonen | |
| 6,715,078 B1 * | 3/2004 | Chasko | G06F 21/34 713/182 |
| 6,768,116 B1 | 7/2004 | Berman et al. | |
| 6,847,850 B2 | 1/2005 | Grumelart | |
| 6,868,538 B1 | 3/2005 | Nixon et al. | |
| 6,965,886 B2 | 11/2005 | Govrin et al. | |
| 6,970,758 B1 | 11/2005 | Shi et al. | |
| 7,072,722 B1 | 7/2006 | Colonna et al. | |
| 7,123,974 B1 | 10/2006 | Hamilton | |
| 7,143,149 B2 | 11/2006 | Oberg et al. | |
| 7,143,289 B2 * | 11/2006 | Denning | G06F 21/10 380/258 |
| 7,213,057 B2 | 5/2007 | Trethewey | |
| 7,222,131 B1 | 5/2007 | Grewal et al. | |
| 7,283,914 B2 | 10/2007 | Poorman et al. | |
| 7,283,971 B1 | 10/2007 | Levine et al. | |
| 7,314,169 B1 | 1/2008 | Jasper et al. | |
| 7,346,404 B2 | 3/2008 | Eryurek et al. | |
| 7,530,113 B2 | 5/2009 | Braun | |
| 7,536,548 B1 | 5/2009 | Batke et al. | |
| RE40,817 E | 6/2009 | Krivoshein et al. | |
| 7,541,920 B2 | 6/2009 | Tambascio et al. | |
| 7,548,873 B2 | 6/2009 | Veeningen et al. | |
| 7,565,306 B2 | 7/2009 | Apostolides | |
| 7,598,856 B1 | 10/2009 | Nick et al. | |
| 7,606,681 B2 | 10/2009 | Esmaili et al. | |
| 7,616,095 B2 | 11/2009 | Jones et al. | |
| 7,617,542 B2 | 11/2009 | Vataja | |
| 7,630,914 B2 | 12/2009 | Veeningen et al. | |
| 7,644,052 B1 | 1/2010 | Chang et al. | |
| 7,653,563 B2 | 1/2010 | Veeningen et al. | |
| 7,668,608 B2 | 2/2010 | Nixon et al. | |
| 7,676,281 B2 | 3/2010 | Hood et al. | |
| 7,680,546 B2 | 3/2010 | Gilbert et al. | |
| 7,684,877 B2 | 3/2010 | Weatherhead et al. | |
| 7,716,489 B1 | 5/2010 | Brandt et al. | |
| 7,720,727 B2 | 5/2010 | Keyes et al. | |
| 7,827,122 B1 | 11/2010 | Campbell, Jr. et al. | |
| 7,853,431 B2 | 12/2010 | Samardzija et al. | |
| 7,925,979 B2 | 4/2011 | Forney et al. | |
| 7,930,639 B2 | 4/2011 | Baier et al. | |
| 7,934,095 B2 | 4/2011 | Laberteaux et al. | |
| 7,962,440 B2 | 6/2011 | Baier et al. | |
| 8,014,722 B2 | 9/2011 | Abel et al. | |
| 8,055,787 B2 | 11/2011 | Victor et al. | |
| 8,060,834 B2 | 11/2011 | Lucas et al. | |
| 8,073,967 B2 | 12/2011 | Peterson et al. | |
| 8,102,400 B1 | 1/2012 | Cook et al. | |
| 8,132,225 B2 | 3/2012 | Chand et al. | |
| 8,166,296 B2 | 4/2012 | Buer et al. | |
| 8,171,137 B1 | 5/2012 | Parks et al. | |
| 8,185,495 B2 | 5/2012 | Clark et al. | |
| 8,185,871 B2 | 5/2012 | Nixon et al. | |
| 8,190,888 B2 | 5/2012 | Batke et al. | |
| 8,191,005 B2 | 5/2012 | Baier et al. | |
| 8,214,455 B2 | 7/2012 | Baier et al. | |
| 8,218,651 B1 | 7/2012 | Eshet et al. | |
| 8,219,669 B2 | 7/2012 | Agrusa et al. | |
| 8,224,496 B2 | 7/2012 | Musti et al. | |
| 8,316,313 B2 | 11/2012 | Campney et al. | |
| 8,321,663 B2 | 11/2012 | Medvinsky et al. | |
| 8,327,130 B2 | 12/2012 | Wilkinson, Jr. et al. | |
| 8,350,666 B2 | 1/2013 | Kore | |
| 8,417,595 B2 | 4/2013 | Keyes et al. | |
| 8,521,332 B2 | 8/2013 | Tiemann et al. | |
| 8,688,780 B2 | 4/2014 | Gordon et al. | |
| 8,832,236 B2 | 9/2014 | Hernandez et al. | |
| 9,021,021 B2 | 4/2015 | Backholm et al. | |
| 9,024,972 B1 | 5/2015 | Bronder et al. | |
| 9,038,043 B1 | 5/2015 | Fleetwood et al. | |
| 9,088,665 B2 | 7/2015 | Boyer et al. | |
| 9,119,166 B1 | 8/2015 | Sheikh | |
| 9,122,786 B2 | 9/2015 | Cammert et al. | |
| 9,229,871 B2 | 1/2016 | Washiro | |
| 9,361,320 B1 | 6/2016 | Vijendra et al. | |
| 9,397,836 B2 | 7/2016 | Nixon et al. | |
| 9,424,398 B1 | 8/2016 | McLeod et al. | |
| 9,430,114 B1 | 8/2016 | Dingman et al. | |
| 9,459,809 B1 | 10/2016 | Chen et al. | |
| 9,541,905 B2 | 1/2017 | Nixon et al. | |
| 9,558,220 B2 | 1/2017 | Nixon et al. | |
| 2002/0010694 A1 | 1/2002 | Navab et al. | |
| 2002/0035495 A1 | 3/2002 | Spira et al. | |
| 2002/0052715 A1 | 5/2002 | Maki | |
| 2002/0064138 A1 | 5/2002 | Saito et al. | |
| 2002/0094085 A1 * | 7/2002 | Roberts | H04L 9/0869 380/262 |
| 2002/0120475 A1 | 8/2002 | Morimoto | |
| 2002/0128998 A1 | 9/2002 | Kil et al. | |
| 2002/0130846 A1 | 9/2002 | Nixon et al. | |
| 2002/0138168 A1 | 9/2002 | Salonen | |
| 2002/0149497 A1 | 10/2002 | Jaggi | |
| 2002/0169514 A1 | 11/2002 | Eryurek et al. | |
| 2003/0020726 A1 | 1/2003 | Charpentier | |
| 2003/0023795 A1 | 1/2003 | Packwood et al. | |
| 2003/0028495 A1 | 2/2003 | Pallante | |
| 2003/0061295 A1 | 3/2003 | Oberg et al. | |
| 2003/0083756 A1 | 5/2003 | Hsiung et al. | |
| 2003/0154044 A1 | 8/2003 | Lundstedt et al. | |
| 2003/0195934 A1 | 10/2003 | Peterson et al. | |
| 2004/0093102 A1 | 5/2004 | Liiri et al. | |
| 2004/0117233 A1 | 6/2004 | Rapp | |
| 2004/0153437 A1 | 8/2004 | Buchan | |
| 2004/0203874 A1 | 10/2004 | Brandt et al. | |
| 2004/0204775 A1 | 10/2004 | Keyes et al. | |
| 2004/0210330 A1 | 10/2004 | Birkle | |
| 2004/0230328 A1 | 11/2004 | Armstrong et al. | |
| 2004/0233930 A1 | 11/2004 | Colby | |
| 2005/0005259 A1 | 1/2005 | Avery et al. | |
| 2005/0062677 A1 | 3/2005 | Nixon et al. | |
| 2005/0080799 A1 | 4/2005 | Harnden et al. | |
| 2005/0130634 A1 | 6/2005 | Godfrey | |
| 2005/0164684 A1 | 7/2005 | Chen et al. | |

(56) References Cited

U.S. PATENT DOCUMENTS

| | | |
|---|---|---|
| 2005/0182650 A1 | 8/2005 | Maddox et al. |
| 2005/0187649 A1 | 8/2005 | Funk et al. |
| 2005/0213768 A1* | 9/2005 | Durham .................. G06F 21/57 380/278 |
| 2005/0222691 A1 | 10/2005 | Glas et al. |
| 2005/0264527 A1 | 12/2005 | Lin |
| 2006/0031826 A1 | 2/2006 | Hiramatsu et al. |
| 2006/0064291 A1 | 3/2006 | Pattipatti et al. |
| 2006/0064472 A1 | 3/2006 | Mirho |
| 2006/0069717 A1 | 3/2006 | Mamou et al. |
| 2006/0087402 A1 | 4/2006 | Manning et al. |
| 2006/0168396 A1 | 7/2006 | LaMothe et al. |
| 2006/0200260 A1 | 9/2006 | Hoffberg et al. |
| 2006/0200771 A1 | 9/2006 | Nielsen et al. |
| 2006/0218107 A1 | 9/2006 | Young |
| 2006/0241792 A1 | 10/2006 | Pretlove et al. |
| 2006/0288091 A1 | 12/2006 | Oh et al. |
| 2007/0005266 A1 | 1/2007 | Blevins et al. |
| 2007/0014406 A1* | 1/2007 | Scheidt ................. H04L 9/0869 380/258 |
| 2007/0038889 A1 | 2/2007 | Wiggins et al. |
| 2007/0067725 A1 | 3/2007 | Cahill et al. |
| 2007/0078696 A1 | 4/2007 | Hardin |
| 2007/0112574 A1 | 5/2007 | Greene |
| 2007/0130310 A1 | 6/2007 | Batke et al. |
| 2007/0132779 A1 | 6/2007 | Gilbert et al. |
| 2007/0139441 A1 | 6/2007 | Lucas et al. |
| 2007/0179645 A1 | 8/2007 | Nixon et al. |
| 2007/0185754 A1 | 8/2007 | Schmidt |
| 2007/0250292 A1 | 10/2007 | Alagappan et al. |
| 2007/0265866 A1 | 11/2007 | Fehling et al. |
| 2008/0040719 A1 | 2/2008 | Shimizu et al. |
| 2008/0065243 A1 | 3/2008 | Fallman et al. |
| 2008/0076431 A1 | 3/2008 | Fletcher et al. |
| 2008/0079596 A1 | 4/2008 | Baier et al. |
| 2008/0082180 A1 | 4/2008 | Blevins et al. |
| 2008/0082181 A1 | 4/2008 | Miller et al. |
| 2008/0082195 A1 | 4/2008 | Samardzija |
| 2008/0097622 A1 | 4/2008 | Forney et al. |
| 2008/0103843 A1 | 5/2008 | Goeppert et al. |
| 2008/0104189 A1 | 5/2008 | Baker et al. |
| 2008/0126352 A1 | 5/2008 | Case |
| 2008/0143482 A1 | 6/2008 | Shoarinejad et al. |
| 2008/0174766 A1 | 7/2008 | Haaslahti et al. |
| 2008/0182592 A1 | 7/2008 | Cha et al. |
| 2008/0209443 A1 | 8/2008 | Suzuki |
| 2008/0274766 A1 | 11/2008 | Pratt et al. |
| 2008/0288321 A1 | 11/2008 | Dillon et al. |
| 2008/0297513 A1 | 12/2008 | Greenhill et al. |
| 2008/0301123 A1 | 12/2008 | Schneider et al. |
| 2009/0049073 A1 | 2/2009 | Cho |
| 2009/0065578 A1 | 3/2009 | Peterson et al. |
| 2009/0070337 A1 | 3/2009 | Romem et al. |
| 2009/0070589 A1 | 3/2009 | Nayak et al. |
| 2009/0089359 A1 | 4/2009 | Siorek et al. |
| 2009/0097502 A1 | 4/2009 | Yamamoto |
| 2009/0112335 A1 | 4/2009 | Mehta et al. |
| 2009/0210814 A1 | 8/2009 | Agrusa et al. |
| 2009/0216341 A1 | 8/2009 | Enkerud et al. |
| 2009/0249237 A1 | 10/2009 | Jundt et al. |
| 2009/0294174 A1 | 12/2009 | Harmer et al. |
| 2009/0300535 A1 | 12/2009 | Skourup et al. |
| 2009/0319058 A1 | 12/2009 | Rovaglio et al. |
| 2009/0325603 A1 | 12/2009 | Van Os et al. |
| 2010/0036779 A1 | 2/2010 | Sadeh-Koniecpol et al. |
| 2010/0069008 A1 | 3/2010 | Oshima et al. |
| 2010/0076642 A1 | 3/2010 | Hoffberg et al. |
| 2010/0106282 A1 | 4/2010 | Mackelprang et al. |
| 2010/0127821 A1 | 5/2010 | Jones et al. |
| 2010/0127824 A1 | 5/2010 | Moschl et al. |
| 2010/0145476 A1 | 6/2010 | Junk et al. |
| 2010/0169785 A1 | 7/2010 | Jesudason |
| 2010/0185857 A1 | 7/2010 | Neitzel et al. |
| 2010/0190442 A1 | 7/2010 | Citrano, III et al. |
| 2010/0192122 A1 | 7/2010 | Esfahan et al. |
| 2010/0222899 A1 | 9/2010 | Blevins et al. |
| 2010/0262929 A1 | 10/2010 | Avery |
| 2010/0286798 A1 | 11/2010 | Keyes et al. |
| 2010/0290351 A1 | 11/2010 | Toepke et al. |
| 2010/0293019 A1 | 11/2010 | Keyes et al. |
| 2010/0293564 A1 | 11/2010 | Gould et al. |
| 2010/0305736 A1 | 12/2010 | Arduini |
| 2010/0318934 A1 | 12/2010 | Blevins et al. |
| 2011/0022193 A1 | 1/2011 | Panaitescu |
| 2011/0046754 A1 | 2/2011 | Bromley et al. |
| 2011/0071869 A1 | 3/2011 | O'Brien et al. |
| 2011/0098918 A1 | 4/2011 | Siliski et al. |
| 2011/0115816 A1 | 5/2011 | Brackney |
| 2011/0130848 A1 | 6/2011 | Tegnell et al. |
| 2011/0140864 A1 | 6/2011 | Bucci |
| 2011/0144777 A1 | 6/2011 | Firkins et al. |
| 2011/0191277 A1 | 8/2011 | Ag ndez Dominguez et al. |
| 2011/0258138 A1 | 10/2011 | Kulkarni et al. |
| 2011/0276896 A1 | 11/2011 | Zambetti et al. |
| 2011/0276908 A1 | 11/2011 | O'Riordan |
| 2011/0295722 A1 | 12/2011 | Reisman |
| 2012/0004743 A1 | 1/2012 | Anne et al. |
| 2012/0005270 A1 | 1/2012 | Harding et al. |
| 2012/0010758 A1 | 1/2012 | Francino et al. |
| 2012/0011180 A1 | 1/2012 | Kavaklioglu |
| 2012/0011511 A1 | 1/2012 | Horvitz et al. |
| 2012/0029661 A1 | 2/2012 | Jones et al. |
| 2012/0038458 A1 | 2/2012 | Toepke et al. |
| 2012/0040698 A1 | 2/2012 | Ferguson et al. |
| 2012/0078869 A1 | 3/2012 | Bellville et al. |
| 2012/0095574 A1 | 4/2012 | Greenlee |
| 2012/0147862 A1 | 6/2012 | Poojary et al. |
| 2012/0163521 A1 | 6/2012 | Kirrmann et al. |
| 2012/0176491 A1 | 7/2012 | Garin et al. |
| 2012/0203728 A1 | 8/2012 | Levine |
| 2012/0230309 A1 | 9/2012 | Junk |
| 2012/0239164 A1 | 9/2012 | Smith et al. |
| 2012/0271962 A1 | 10/2012 | Ivanov et al. |
| 2012/0290795 A1 | 11/2012 | Dowlatkhah |
| 2012/0331541 A1 | 12/2012 | Hamilton, II et al. |
| 2013/0006696 A1 | 1/2013 | Louie et al. |
| 2013/0007223 A1 | 1/2013 | Luby et al. |
| 2013/0013523 A1 | 1/2013 | Herrera Campos |
| 2013/0029686 A1 | 1/2013 | Moshfeghi |
| 2013/0041479 A1 | 2/2013 | Zhang et al. |
| 2013/0086591 A1 | 4/2013 | Haven |
| 2013/0095849 A1 | 4/2013 | Pakzad |
| 2013/0144404 A1 | 6/2013 | Godwin et al. |
| 2013/0144405 A1 | 6/2013 | Lo |
| 2013/0144605 A1 | 6/2013 | Brager et al. |
| 2013/0169526 A1 | 7/2013 | Gai et al. |
| 2013/0212129 A1 | 8/2013 | Lawson et al. |
| 2013/0214902 A1 | 8/2013 | Pineau et al. |
| 2013/0231947 A1 | 9/2013 | Shusterman |
| 2013/0265857 A1 | 10/2013 | Foulds et al. |
| 2014/0015672 A1 | 1/2014 | Ponce |
| 2014/0039648 A1 | 2/2014 | Boult et al. |
| 2014/0067800 A1 | 3/2014 | Sharma |
| 2014/0079297 A1 | 3/2014 | Tadayon et al. |
| 2014/0089504 A1 | 3/2014 | Scholz et al. |
| 2014/0122806 A1 | 5/2014 | Lin et al. |
| 2014/0123276 A1 | 5/2014 | Bush et al. |
| 2014/0136652 A1 | 5/2014 | Narayanaswami et al. |
| 2014/0164603 A1 | 6/2014 | Castel et al. |
| 2014/0172961 A1 | 6/2014 | Clemmer et al. |
| 2014/0189520 A1 | 7/2014 | Crepps et al. |
| 2014/0201244 A1 | 7/2014 | Zhou |
| 2014/0232843 A1 | 8/2014 | Campbell |
| 2014/0250153 A1 | 9/2014 | Nixon et al. |
| 2014/0267599 A1 | 9/2014 | Drouin et al. |
| 2014/0273847 A1 | 9/2014 | Nixon et al. |
| 2014/0274123 A1 | 9/2014 | Nixon et al. |
| 2014/0277593 A1 | 9/2014 | Nixon et al. |
| 2014/0277594 A1 | 9/2014 | Nixon et al. |
| 2014/0277595 A1 | 9/2014 | Nixon et al. |
| 2014/0277596 A1 | 9/2014 | Nixon et al. |
| 2014/0277604 A1 | 9/2014 | Nixon et al. |
| 2014/0277605 A1 | 9/2014 | Nixon et al. |
| 2014/0277607 A1 | 9/2014 | Nixon et al. |

(56) References Cited

U.S. PATENT DOCUMENTS

| | | |
|---|---|---|
| 2014/0277615 A1 | 9/2014 | Nixon et al. |
| 2014/0277616 A1 | 9/2014 | Nixon et al. |
| 2014/0277617 A1 | 9/2014 | Nixon et al. |
| 2014/0277618 A1 | 9/2014 | Nixon et al. |
| 2014/0277656 A1 | 9/2014 | Nixon et al. |
| 2014/0278312 A1 | 9/2014 | Nixon et al. |
| 2014/0280497 A1 | 9/2014 | Nixon et al. |
| 2014/0280678 A1 | 9/2014 | Nixon et al. |
| 2014/0282015 A1 | 9/2014 | Nixon et al. |
| 2014/0282227 A1 | 9/2014 | Nixon et al. |
| 2014/0282257 A1 | 9/2014 | Nixon et al. |
| 2014/0297225 A1 | 10/2014 | Petroski et al. |
| 2014/0316579 A1 | 10/2014 | Taylor et al. |
| 2014/0358256 A1 | 12/2014 | Billi et al. |
| 2014/0359552 A1 | 12/2014 | Misra et al. |
| 2014/0372561 A1 | 12/2014 | Hisano |
| 2015/0024710 A1 | 1/2015 | Becker et al. |
| 2015/0067163 A1 | 3/2015 | Bahnsen et al. |
| 2015/0106578 A1 | 4/2015 | Warfield et al. |
| 2015/0172872 A1 | 6/2015 | Alsehly et al. |
| 2015/0177718 A1 | 6/2015 | Vartiainen et al. |
| 2015/0220080 A1 | 8/2015 | Nixon et al. |
| 2015/0222731 A1 | 8/2015 | Shinohara et al. |
| 2015/0246852 A1 | 9/2015 | Chen et al. |
| 2015/0261215 A1 | 9/2015 | Blevins et al. |
| 2015/0332188 A1 | 11/2015 | Yankelevich et al. |
| 2016/0098021 A1 | 4/2016 | Zornio et al. |
| 2016/0098037 A1 | 4/2016 | Zornio et al. |
| 2016/0098388 A1 | 4/2016 | Blevins et al. |
| 2016/0098647 A1 | 4/2016 | Nixon et al. |
| 2016/0132046 A1 | 5/2016 | Beoughter et al. |
| 2017/0102678 A1 | 4/2017 | Nixon et al. |
| 2017/0102693 A1 | 4/2017 | Kidd et al. |
| 2017/0102694 A1 | 4/2017 | Enver et al. |
| 2017/0102696 A1 | 4/2017 | Bell et al. |
| 2017/0103103 A1 | 4/2017 | Nixon et al. |
| 2017/0115648 A1 | 4/2017 | Nixon et al. |

FOREIGN PATENT DOCUMENTS

| | | |
|---|---|---|
| CN | 104049575 A | 9/2014 |
| DE | 19882113 T1 | 1/2000 |
| DE | 19882117 T1 | 1/2000 |
| EP | 0 335 957 A1 | 10/1989 |
| EP | 1 344 291 A1 | 9/2003 |
| EP | 1 414 215 A2 | 4/2004 |
| EP | 1 564 647 A2 | 8/2005 |
| EP | 1 912 376 A1 | 4/2008 |
| EP | 2 003 813 A1 | 12/2008 |
| EP | 2 112 614 A1 | 10/2009 |
| EP | 2 469 475 A1 | 6/2012 |
| EP | 1 344 291 B1 | 8/2012 |
| EP | 2 685 329 A1 | 1/2014 |
| EP | 2 801 939 A1 | 11/2014 |
| FR | 2 966 625 A1 | 4/2012 |
| GB | 2 336 977 B | 11/1999 |
| GB | 2 336 923 B | 6/2002 |
| GB | 2 403 028 A | 12/2004 |
| GB | 2 453 426 A | 4/2009 |
| GB | 2 512 984 A | 10/2014 |
| GB | 2 512 997 A | 10/2014 |
| GB | 2 532 849 A | 6/2016 |
| GB | 2 534 628 A | 8/2016 |
| GB | 2 537 457 A | 10/2016 |
| JP | 08-234951 | 9/1996 |
| JP | 2001-512593 A | 8/2001 |
| JP | 2006-221376 A | 8/2006 |
| JP | 2007-536631 A | 12/2007 |
| JP | 2007-536648 A | 12/2007 |
| JP | 2009-140380 A | 6/2009 |
| JP | 2012-084162 A | 4/2012 |
| JP | 4-934482 B2 | 5/2012 |
| JP | 2014-116027 A | 6/2014 |
| WO | WO-02/50971 | 6/2002 |
| WO | WO-03/073688 A1 | 9/2003 |
| WO | WO-2005/083533 A1 | 9/2005 |
| WO | WO-2005/109123 A1 | 11/2005 |
| WO | WO-2008/042786 A2 | 4/2008 |
| WO | WO-2009/046095 A1 | 4/2009 |
| WO | WO-2011/120625 A1 | 10/2011 |
| WO | WO-2012/022381 A1 | 2/2012 |
| WO | WO-2014/005073 A1 | 1/2014 |
| WO | WO-2015/138706 A1 | 9/2015 |

OTHER PUBLICATIONS

"ANSI/ISA-S5.4-1991 American National Standard Instrument Loop Diagrams" by Instrument Society of America, 1986, 22 pages.

"Control Loop Foundation—Batch and Continuous Processes", by Terrence Blevins and Mark Nixon, *International Society of Automation*, 2011, Chapter 7.

"IoT and Big Data Combine Forces," (2013). Retrieved from the Internet at: URL:http://wiki.advantech.com/images/7/73/iot2013_whitepaper.pdf.

Bassat et al., "Workflow Management Combined with Diagnostic and Repair Expert System Tools for Maintenance Operations," IEEE, pp. 367-375 (1993).

Bryner, "Smart Manufacturing: The Next Revolution," Chemical Engineering Process (2012). Retrieved from the Internet at: URL:http://www.aiche.org/sites/default/files/cep/20121004a.pdf.

Building Smarter Manufacturing with the Internet of Things (IoT), (2014). Retrieved from the Internet at: URL:http://www.cisco.com/web/solutions/trends/iot/iot_in_manufacturing_january.pdf.

Communication Relating to the Results of the Partial International Search, dated Jul. 11, 2014.

Examination Report for Application No. GB1017192.4, dated May 28, 2014.

Examination Report for Application No. GB1017192.4, dated Sep. 5, 2013.

First Office Action for Chinese Application No. 201010589029.X, dated Dec. 10, 2013.

International Search Report and Written Opinion for Application No. PCT/US2014/030627, dated Sep. 11, 2014.

International Search Report and Written Opinion for Application No. PCT/US2015,053931, dated Jan. 26, 2016.

International Search Report and Written Opinion for Application No. PCT/US2015/020148, dated Jun. 18, 2015.

Krumeich et al., "Big Data Analytics for Predictive Manufacturing Control—A Case Study from Process Industry," IEEE International Congress on Big Data, pp. 530-537 (2014).

Notice of Reasons for Rejection for Japanese Application No. 2010-229513, dated Jul. 29, 2014.

Search Report for Application No. GB1017192.4, dated Feb. 15, 2011.

Search Report for Application No. GB1402311.3, dated Aug. 6, 2014.

Search Report for Application No. GB1403251.0, dated Aug. 8, 2014.

Search Report for Application No. GB1403407.8, dated Aug. 8, 2014.

Search Report for Application No. GB1403408.6, dated Aug. 8, 2014.

Search Report for Application No. GB1403471.4, dated Sep. 9, 2014.

Search Report for Application No. GB1403472.2, dated Aug. 22, 2014.

Search Report for Application No. GB1403474.8, dated Aug. 26, 2014.

Search Report for Application No. GB1403475.5, dated Sep. 3, 2014.

Search Report for Application No. GB1403476.3, dated Aug. 27, 2014.

Search Report for Application No. GB1403477.1, dated Aug. 28, 2014.

Search Report for Application No. GB1403478.9, dated Aug. 21, 2014.

Search Report for Application No. GB1403480.5, dated Aug. 28, 2014.

(56) References Cited

OTHER PUBLICATIONS

Search Report for Application No. GB1403615.6, dated Aug. 18, 2014.
Search Report for Application No. GB1403616.4, dated Sep. 1, 2014.
Search Report for Application No. GB1501042.4, dated Feb. 2, 2016.
Search Report for Application No. GB1513617.9, dated Jan. 21, 2016.
Search Report for Application No. GB1517034.3, dated May 26, 2016.
Search Report for Application No. GB1517038.4, dated Mar. 22, 2016.
Smalley, "GE Invests in Project to Embed Predictive Analytics in Industrial Internet," (2013). Retrieved from the Internet at: URL:http://data-informed.com/ge-invents-in-project-to-embed-predictive-analytics-in-industrial-internet/.
U.S. Appl. No. 13/784,041, filed Mar. 4, 2013.
U.S. Appl. No. 14/028,785, filed Sep. 17, 2013.
U.S. Appl. No. 14/028,897, filed Sep. 17, 2013.
U.S. Appl. No. 14/028,913, filed Sep. 17, 2013.
U.S. Appl. No. 14/028,921, filed Sep. 17, 2013.
U.S. Appl. No. 14/028,923, filed Sep. 17, 2013.
U.S. Appl. No. 14/028,964, filed Sep. 17, 2013.
U.S. Appl. No. 14/174,413, filed Feb. 6, 2014, "Collecting and Delivering Data to a Big Data Machine in a Process Control System".
U.S. Appl. No. 14/212,411, filed Mar. 14, 2014, "Determining Associations and Alignments of Process Elements and Measurements in a Process".
U.S. Appl. No. 14/212,493, filed Mar. 14, 2014, "Distributed Big Data in a Process Control System".
U.S. Appl. No. 14/506,863, filed Oct. 6, 2014, "Streaming Data for Analytics in Process Control Systems".
U.S. Appl. No. 14/507,252, filed Oct. 6, 2014, "Automatic Signal Processing-Based Learning in a Process Plant".
U.S. Appl. No. 62/060,408, filed Oct. 6, 2014, "Data Pipeline for Process Control System Analytics".
Woo, "Intel Drops a Big Data Shocker", downloaded from the Internet at: http://forbes.com/sites/bwoo/2013/02/27/intel-drops-a-big-data-shocker/?partner=ya dated Feb. 27, 2013.
Examination Report for Application No. EP 14724871.0, dated Aug. 17, 2016.
Adrian et al., "Model Predictive Control of Integrated Unit Operations Control of a Divided Wall Column," Chemical Engineering and Processing: Process Information, 43(3):347-355 (2004).
Daniel et al., "Conceptual Design of Reactive Dividing Wall Columns," Symposium Series No. 152, pp. 364-372 (2006).
Dejanovic et al., "Conceptual Design and Comparison of Four-Products Dividing Wall Columns for Separation of a Multicomponent Aromatics Mixture," Distillation Absorption, pp. 85-90 (2010).
Dongargaonkar et al., "PLC Based Ignition System," Conference Records of the 1999 IEEE Industry Application Conference, 1380-1387 (1999).
Hiller et al., "Multi Objective Optimisation for an Economical Dividing Wall Column Design," Distillation Absorption, pp. 67-72 (2010).
International Preliminary Report on Patentability for Application No. PCT/US2014/030627, dated Sep. 15, 2015.
International Preliminary Report on Patentability for Application No. PCT/US2015/020148, dated Sep. 14, 2016.
Kiss et al., "A control Perspective on Process Intensification in Dividing-Wall Columns," Chemical Engineering and Processing: Process Intensification, 50:281-292 (2011).
Pendergast et al., "Consider Dividing Wall Columns," Chemical Processing (2008). Retrieved from the Internet at: URL:http://www.chemicalprocessing.com/articles/2008/245?show=all.
Sander et al., "Methyl Acetate Hydrolysis in a Reactive Divided Wall Column," Symposium Series No. 152, pp. 353-363 (2006).
Schultz et al., "Reduce Costs with Dividing-Wall Columns," Reactions and Separations, pp. 64-71 (2002).
Shah et al., "Multicomponent Distillation Configurations with Large Energy Savings," Distillation Absorption, pp. 61-66 (2010).
Thotla et al., "Cyclohexanol Production from Cyclohexene in a Reactive Divided Wall Column: A Feasibility Study," Distillation Absorption, pp. 319-324 (2010).
Tututi-Avila et al., "Analysis of Multi-Loop Control Structures of Dividing-Wall Distillation Columns Using a Fundamental Model," Processes, 2:180-199 (2014).
U.S. Office Action for U.S. Appl. No. 13/784,041 dated Apr. 6, 2015.
U.S. Office Action for U.S. Appl. No. 13/784,041, dated Feb. 26, 2016.
U.S. Office Action for U.S. Appl. No. 13/784,041, dated Oct. 15, 2015.
Hu et al., "Toward Scalable Systems for Big Data Analytics: A Technology Tutorial," IEEE, 2:652-687 (2014).
Lee et al., "Recent Advances and Trends in Predictive Manufacturing Systems in Big Data Environment," Manufacturing Letters, 1(1):38-41 (2013).
Mahdavi et al., "Development of a Simulation-Based Decision Support System for Controlling Stochastic Flexible Job Shop Manufacturing Systems," Simulation Modeling Practice and Theory, 18:768-786 (2010).
Mezmaz et al., "A Parallel Bi-Objective Hybrid Metaheuristic for Energy-Aware Scheduling for Cloud Computing Systems," Journal of Parallel and Distributed Computing, Elsevier (2011).
Notification of First Office Action for Chinese Application No. 201480014734.3, dated Apr. 19, 2017.
Razik et al., "The Remote Surveillance Device in Monitoring and Diagnosis of Induction Motor by Using a PDA," IEEE (2007).
Search Report for Application No. GB1617019.3, dated Feb. 27, 2017.
Siltanen et al., "Augmented Reality for Plant Lifecycle Management," IEEE (2007).
Xu, "From Cloud Computing to Cloud Manufacturing," Robotics and Computer-Integrated Manufacturing 28:75-86 (2012).

\* cited by examiner

SECURING DEVICES TO PROCESS CONTROL SYSTEMS

CROSS-REFERENCES TO RELATED APPLICATIONS

The present application is a divisional application of U.S. patent application Ser. No. 14/456,763, entitled "SECURING DEVICES TO PROCESS CONTROL SYSTEMS," which was filed on Aug. 11, 2014, and which will issue as U.S. Pat. No. 9,397,836 on Jul. 19, 2016. The present application is also related to the following patent applications: U.S. patent application Ser. No. 13/784,041, entitled "BIG DATA IN PROCESS CONTROL SYSTEMS" and filed on Mar. 4, 2013; U.S. patent application Ser. No. 14/212,493, entitled "DISTRIBUTED BIG DATA IN A PROCESS CONTROL SYSTEM" and filed on Mar. 14, 2014; U.S. patent application Ser. No. 14/028,785, entitled "METHOD AND APPARATUS FOR CONTROLLING A PROCESS PLANT WITH LOCATION AWARE MOBILE CONTROL DEVICES" and filed on Sep. 17, 2013; U.S. patent application Ser. No. 14/028,897, entitled "METHOD AND APPARATUS FOR CONTROLLING A PROCESS PLANT WITH LOCATION AWARE MOBILE CONTROL DEVICES" and filed on Sep. 17, 2013; U.S. patent application Ser. No. 14/028,913, entitled "METHOD FOR INITIATING OR RESUMING A MOBILE CONTROL SESSION IN A PROCESS PLANT" and filed on Sep. 17, 2013; U.S. patent application Ser. No. 14/028,921, entitled "METHOD FOR INITIATING OR RESUMING A MOBILE CONTROL SESSION IN A PROCESS PLANT" and filed on Sep. 17, 2013; U.S. patent application Ser. No. 14/028,923, entitled "METHOD AND APPARATUS FOR DETERMINING THE POSITION OF A MOBILE CONTROL DEVICE IN A PROCESS PLANT" and filed on Sep. 17, 2013; and U.S. patent application Ser. No. 14/028,964, entitled "MOBILE CONTROL ROOM WITH REAL-TIME ENVIRONMENT AWARENESS" and filed on Sep. 17, 2013, which is hereby incorporated by reference herein in its entirety; the entire disclosures of which are hereby incorporated by reference in their entireties.

TECHNICAL FIELD

The present disclosure relates generally to process plants and to process control systems, and more particularly, to securing devices and components of process plants and process control systems.

BACKGROUND

Distributed process control systems, like those used in chemical, petroleum or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as the field devices conforming to the well-known Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that may be placed in control rooms or other locations away from the harsher plant environment. In some process plants, at least some of these hardware devices are centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths. In some process plants, at least a portion of the data highway includes a process control network that supports big data.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller or field device application that runs the control modules assigned and downloaded thereto to implement actual process control functionality. The viewing applications, which may be executed on one or more operator workstations (or on one or more remote computing devices in communicative connection with the operator workstations and the data highway), receive data from the controller or field device application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

In some arrangements, a distributed process control system includes a big data network or system that provides an infrastructure for supporting large scale data mining and data analytics of process data (referred to herein interchangeably as a "process control big data network" or a "big data process control network." Examples of such process control system big data networks or systems may be found in aforementioned U.S. patent application Ser. No. 13/784,041 entitled "BIG DATA IN PROCESS CONTROL SYSTEMS," and in aforementioned U.S. patent application Ser. No. 14/212,493 entitled "DISTRIBUTED BIG DATA IN A PROCESS CONTROL SYSTEM." A big data process control network or system includes a plurality of nodes to collect and store all (or almost all) data that is generated, received, and/or observed by devices included in and associated with the process control system or plant. The nodes may be interconnected via a big data network backbone, e.g., an Internet Protocol backbone, a backbone utilizing a process control-specific protocol that supports big data, or other networked set of computing devices. In some embodiments, the backbone of the big data network may intersect at least partially with at least part of the process control system that does not support big data.

In some process plants that support big data, one of the nodes of the process control big data network is a process control system big data apparatus at which big data is centrally stored, managed, and/or historized. The process control system big data apparatus includes, for example, a unitary, logical data storage area that is configured to store, using a common format, multiple types of data that are generated by or related to the process control system, the process plant, and to one or more processes being controlled by the process plant. For example, the unitary, logical data storage area may store configuration data, continuous data, event data, plant data, data indicative of a user action, network management data, and data provided by or to systems external to the process control system or plant. At other process control nodes, data (e.g., big data) is time-stamped, cached and/or stored, and then may be streamed to the big data apparatus for consolidation and storage.

Other nodes of a big data process control network may include, for example, process control devices such as controllers, field devices, and/or I/O (Input/Output) cards connecting field devices to controllers. Additional examples of nodes which may be included in a process control big data network are routers, access points, gateways, adaptors, etc.

In some process plant that support big data, at least some of the big data is locally stored, managed, and/or historized, e.g., the big data is distributively stored, managed, and/or historized across multiple nodes of the big data process control network. For example, each distributed big data node may locally store respective configuration data, continuous data, event data, plant data, data indicative of a user action, network management data, and data provided by or to systems external to the process control system or plant.

Further, whether at the big data apparatus and/or at distributed big data nodes, the big data process control system provides services and/or data analyses to automatically or manually discover prescriptive and/or predictive knowledge, and to determine, based on the discovered knowledge, changes and/or additions to the process control system and to the set of services and/or analyses to optimize the process control system or plant.

Irrespective of whether or not a process control system includes or does not include support for big data, though, an important aspect of distributed control systems is the ability to distribute and connect devices and components throughout a plant, or even throughout various plants owned or operated by a single company or organizational entity. These devices and/or components may vary in functionality. For example, some of the devices and/or components may be directly involved in controlling a process (e.g., a controller, a field device, etc.), and/or some of the devices and/or components may be involved in setting up, managing, maintaining, and/or diagnosing at least portions of a plant (e.g., configuration devices, diagnostic devices, data collection and analysis devices, etc.). Further, some of the devices and/or components may include a user interface (e.g., an operator workstation, a mobile computing device, a piece of testing equipment, etc.). At least some of the devices and/or components may be essentially stationary, such as a controller, pump, or sensor. At least some of the devices and/or components may be mobile, such as a laptop computer, a tablet computing device, or portable diagnostic tool.

Security of devices and/or components associated with a process control system of process control plant is emerging as a key topic of concern. Devices and/or components that connect to process control networks (and, in particular, mobile devices and/or components that dynamically connect to and disconnect from process control networks) must be secured so as to mitigate potential theft of data and malicious attack. Failure to do so may result in loss of control of the process and its output. Further, use of unsecure devices and components during real-time operation of a process plant may result in breaches of private networks and data and, in some cases, the occurrence of catastrophic events such as explosions, fires, and/or loss of equipment and/or human life. Still further, devices and/or components may need to be secured or verified for use in a process control system to validate the devices and/or components for their respective designated and intended use, as well as to mitigate possible illegal re-use and/or malicious use of the devices and/or components.

SUMMARY

Embodiments of the techniques, methods, systems and devices disclosed herein allow a device or component to be secured to a process control network or plant, or allow the device or component to securely access the process control network or plant, so that the device or component is safely included and utilized in or with a process control system or process plant as intended. The techniques, methods, systems, and devices disclosed herein may apply to various different types of devices or components having different functionalities associated with a process control system or plant. For example, as previously discussed, the device or the component that is to be secured may be used to control a process operating in or being controlled in real-time by the process control system or process plant (e.g., a controller, a field device, I/O card, etc.). A securable device or component may be used to set up, manage, maintain, and/or diagnose at least portions of a process control system or plant (e.g., configuration devices, diagnostic tools, data collection and analysis devices, etc.). A securable device or component for use during real-time operation of the process plant may include a user interface (e.g., an operator workstation, a mobile computing device, testing equipment, a process control device including an integral user interface, etc.). The securable device or component may be essentially stationary, or the securable device or component may be mobile. The securable device may be a wired device, a wireless device, or may include both a wired and a wireless interface. In an embodiment, the securable device or component operates as a node in a process control system big data network.

Generally, a device or component that is securable to a process plant or process control system (and/or that may authorized to securely access a process control network of the process control plant or system) using at least some of the techniques described herein includes a processor and a memory (which may be a non-volatile memory or other suitable memory). The memory is configured to store computer-executable instructions that are executable by the processor to cause the device or component to be secured to or to securely access the process control system or plant. In some cases, at least a portion of the computer-executable instructions are stored in the device or component prior to delivery to the process control system or plant (e.g., at the manufacturing plant, factory, staging or shipping site, etc.), and/or prior to configuring or utilizing the device or component for real-time operation while the process plant operates to control a process. The instructions that are stored in the memory of the device or component a priori are generally not alterable during transit or while the device is in the field.

Additionally or alternatively, the memory or a different memory included in the device or component is configured to store one or more indications of a set of necessary conditions, characteristics, and/or attributes that must be met before the device or component is allowed to communicatively connect to the process control network or system (e.g., "necessary" conditions and/or attributes). In some cases, at least a portion of the one or more indications of the set of necessary conditions is stored in or provisioned into the device or component prior to delivery to the process control system or plant (e.g., at the manufacturing plant, factory, staging or shipping site, etc.), and/or prior to configuring or utilizing the device or component for real-time operation while the process plant operates to control a process. Typically, the indications that are stored a priori are not be alterable during transit or while the device is in the field.

In some situations, the set of necessary conditions, characteristics, and/or attributes is descriptive or indicative of the device itself, e.g., type of device, model, manufacturer, serial number, etc. Additionally or alternatively, the set of necessary conditions and/or attributes is descriptive or indicative of types, values, and/or states of data that the device may transmit and/or receive while operating in or in conjunction with the process plant. Still further additionally or alternatively, the set of necessary conditions, characteristics, and/or attributes is descriptive or indicative of an environment in which the device may be located (e.g., upon initialization or boot-up for real-time operation in the process plant). In some cases, the set of necessary conditions is associated with a particular user or group of users of the device. Typically, but not necessarily, the set of necessary conditions, characteristics, and/or attributes are conditions, characteristics, and/or attributes that are relatively static so long as the device is stationary. For example, the set of necessary conditions may include a particular geo-spatial location of the device, but would not include a signal strength of a wireless signal observed by the device and would not include a dynamic operating state of the device itself (e.g., power-saving mode, sleep mode, etc.).

Further, the devices or components that are securable to a process control plant, system or network using embodiments of the techniques described herein also include at least one interface to at least one respective communication link of the process control plant, system or network. The communication link may be wired or wireless. The communication link may support process control-specific protocols (e.g., Fieldbus, HART, WirelessHART, process control-specific big data protocol, etc.), and/or may support general communication protocols such as Ethernet or IP protocols. In some embodiments, to access a communication link, a first device or component interfaces with a second device or component, and the second device communicates information on behalf of the first device or component (e.g., a field device connected to an I/O card) via the communication link.

In an embodiment, a device or component self-secures. For example, the device or component is provisioned or configured with one or more indications of a set of respective necessary conditions, characteristics, and/or attributes that must be met in order for the device to be secured. As such, after or upon initialization/boot-up of the device or component for the purposes of real-time operation within the process plant, and prior to communicating with any other device to configure the device for real-time operation in the process plant and/or to operate the device during real-time operations of the process plant, the device or component detects or determines a set of current conditions or characteristics corresponding to itself and/or corresponding to the environment in which it is presently located. Typically, the device performs said detection or determination without communicating with any other devices of the process plant. Additionally, the device determines whether or not the set of detected, current conditions comports with or adheres to the set of necessary conditions. If the necessary conditions are met, then the device proceeds to communicate with another networked device or component of the process control system or plant, for configuration and/or real-time operation purposes. If the necessary conditions are not met, the device or component does not allow itself to communicate with another networked device or component of the process control plant or network, e.g., the device or component prevents itself from communicating with any other devices and/or from communicating over any process control network. In this manner, the device or component self-checks and self-isolates itself from the process control system or plant when the necessary conditions are not met, thus providing a level of security to the process control system or plant, and providing assurance that the device or component only operates as intended (e.g., only at a designated location and/or time, and/or only when some other criteria is met). It is noted, though, that although a particular device or component is isolated from process control networks, the particular device or component need not be isolated from other types of networks (e.g., publically available communication networks, company private networks, etc.).

In an embodiment, a device or component is secured to a process control network using an authentication process, for example, by using cryptographic keys. In general computing and communication networks, cryptographic keys typically are generated from a random or pseudo-random number for security purposes. In process control system networks and plants utilizing embodiments of the techniques disclosed herein, though, an additional level of security is added. In an example, to secure a device or components particularly for a process plant, the device or component is associated with a key generated from a seed that includes both a number and key generation data. The key generation data indicates the set of necessary conditions (e.g., environmental conditions, location, data states or values, etc.) that must be met before a host device or component (e.g., a device or component that is provisioned with the key) is authorized to access the process control network. That is, the seed (which includes both the number and key generation data) may be used to generate a key, and the key may be provisioned or configured into a target device or component so that the provisioned target device or components is the host device or component.

In an embodiment, an alternative or additional level of security is added to secure devices or components for use in a process control system or plant. In this embodiment, a key is generated for a device/component from a seed that indicates first necessary conditions (e.g., environmental conditions, location, data states or values, etc.) that must be met for the device/component to be authorized to the process control network. Additionally, a sub-key is generated from the key, where the sub-key corresponds to a second set of necessary conditions (e.g., environmental conditions, location, data states or values, etc.) that must be met for the device/component to be authorized to the process control network. The first and the second sets of conditions may be defined by different parties, in some cases.

These and other techniques for securing devices and components to communicate with a process control system or process plant network are described in more detail below. It is noted that embodiments of the techniques described herein may be utilized singly, or in combination with one or more other techniques to secure devices or components for use with a process control system or process plant.

DETAILED DESCRIPTION

Figure 1:
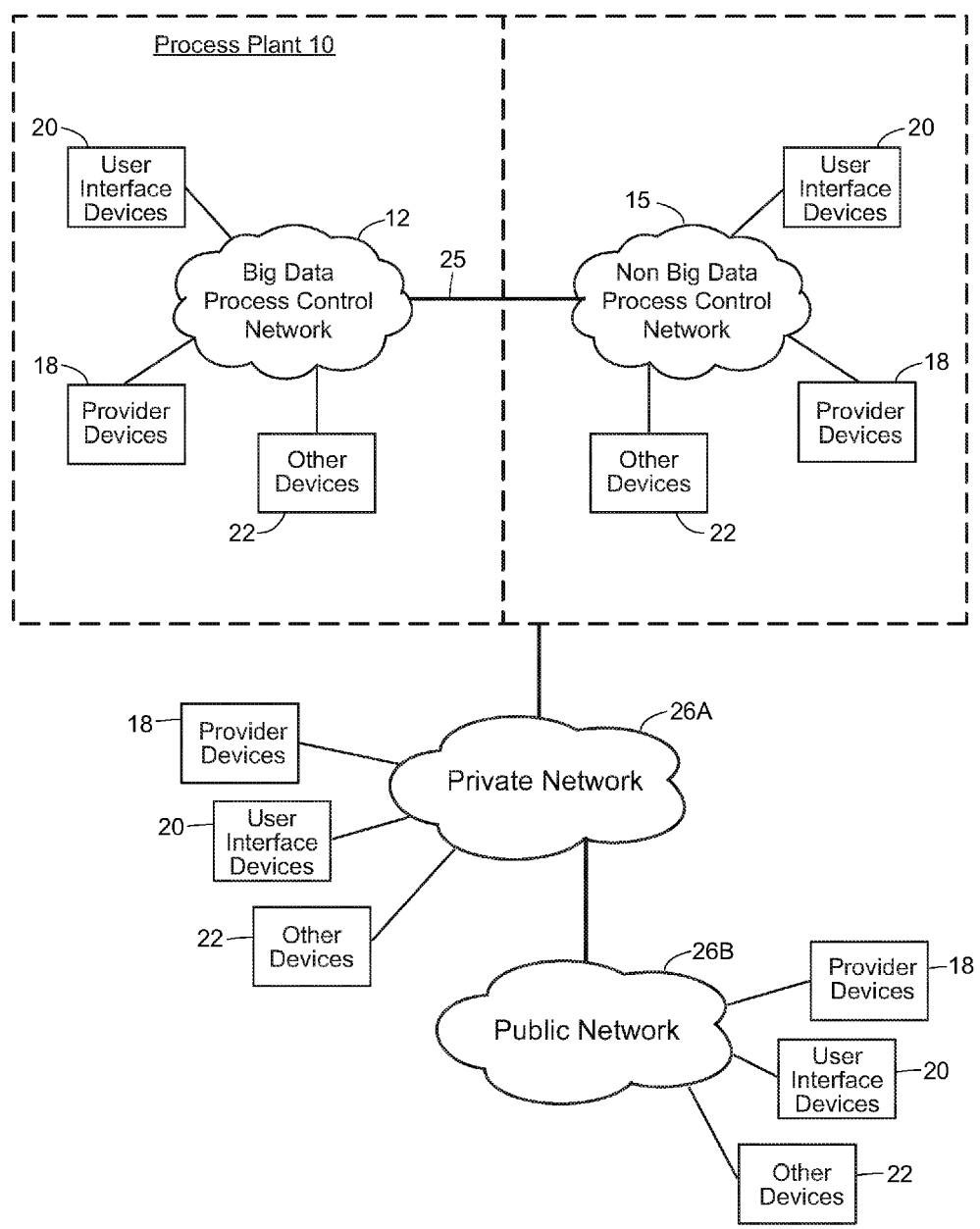
FIG. 1 is a block diagram of an example process control system or process plant including one or more networks to which a device or component may communicatively connect.

FIG. 1 is a block diagram of an example process plant 10 (also referred to interchangeably herein as a "process control system," "distributed process control system," or "automated industrial system") configured to control one or more processes. The process plant 10 may be, for example, a chemical, petroleum, manufacturing or other process plant having an industrial application. The distributed process control system or plant 10 may include one or more networks 12, 15 to which a device or component may connect or access to communicate information. For illustrative purposes, the process plant 10 of FIG. 1 is shown as including a set of one or more networks 12 that are configured to support process control big data, and the process plant 10 is shown as including a set of one or more networks 15 that are not configured to support process control big data (e.g., networks 15 that support one or more protocols that used in legacy process control environments such as Ethernet, EthernetIP, DeviceNet, CompNet, ControlNet, Modbus, Fieldbus, HART®, WirelessHART®, Wi-Fi, etc., and/or other wired or wireless networks). In some embodiments, though, a process control system or plant 10 may include only big data process control networks 12, or may include only non-big data process control networks 15. In embodiments in which a process control system or plant 10 includes both types of networks 12, 15, the two types of networks 12, 15 may be communicatively connected via a gateway or network interface 25, for example.

Various types of devices and components are communicatively connected to one or both of the sets of networks 12, 15. As used herein, a "device" or a "component" is interchangeably referred to as a "node" of a network 12, 15. Typically, a network node is configured to send and/or receive communications via the one or more networks 12, 15 to which it is communicatively connected. Also typically, but not necessarily, a network node may be referenced by a respective network address. In some cases, a network node generates the data or information that it transmits. In some cases, a network node receives data or information and performs a function using the received data or information, e.g., to control the process executing within the process plant, and/or stores the received data or information. In some cases, a network node may route data or information in the one or more networks 12, 15. It is noted that in FIG. 1, although devices 18, 20, 22 are shown as being communicatively connected to either the big data network 12 or to the non-big data network 15, this configuration is for ease of viewing only and is not limiting. For example, one or more of the devices 18, 20, 22 may be communicatively connected to both the big data network 12 and to the non-big data network 15, e.g., one or more of the devices 18, 20, 22 may be both a node of the big data network 12 and a node of the non-big data network 15.

Additionally, the networks 12, 15 of the process plant 10 may be accessible via an external (with respect to the process plant 10) private network 26a and/or a public network 26b. In some configurations, the networks 12, 15 of the process plant 10 are included in or communicatively connected to a private network 26a provided by an enterprise that owns and/or operates the process plant 10. For example, the networks 12, 15 of the process plant 10 are included in a private enterprise network 26a that includes other networks of the enterprise that support various functions of the enterprise, such as networks for personnel management, inventory, business forecasting, accounting, etc. In another example, an enterprise operates multiple process plants, each of which has its own respective networks 12, 15, and the multiple networks 12, 15 of the multiple process plants are included in or communicatively connected to a private enterprise network 26a of the enterprise (which may, in turn, communicatively connect to one or more enterprise support networks). In some configurations, the networks 12, 15 of the process plant 10 are communicatively connected to one or more public networks 26b, such as the Internet, a data network, and/or a telecommunications network. The networks 12, 15 of the process plant 10 may be communicatively connected to the public network 26b via a private network 26a as shown in FIG. 1, or may be communicatively connected to the public network 26b via a direct connection, e.g., without using an intervening private network 26a.

Generally, the private network 26a and/or the public network 26b may utilize any known network technology or technologies. For example, the private network 26a and/or the public network 26b may utilize wired and/or wireless connections or links, packet networks, synchronous networks, asynchronous networks, ad-hoc networks, cloud networks, client/server networks, and/or networks or links that utilize any other known networking technology.

The plurality of nodes of the process control system 10 may include several different groups or types of nodes 18-22. In the process plant 10, one or more nodes 18-22 may be communicatively connected to the big data process control network 12, and one or more nodes 18-22 may be communicatively connected to the non-big data network 15. In some embodiments, one or more nodes 18-22 associated with the process plant 10 are communicatively connected to at least one of the networks 12, 15 of the process plant 10 via one or more private networks 26a and/or via one or more public networks 26b.

A first group of nodes 18, referred to herein as "provider nodes," "provider components," or "provider devices," includes nodes, components or devices that generate, transmit, route, and/or receive real-time process control data to enable one or more processes to be controlled in real-time in the process plant environment 10. Examples of provider devices or nodes 18 include devices whose primary function is directed to generating and/or operating on process control data to control a process, e.g., process control devices such as wired and wireless field devices, controllers, or input/output (I/O) devices. Other examples of provider devices 18 include devices whose primary function is to provide access to or routes through one or more communication networks 12, 15 of the process control system 10, e.g., networking devices such as access points, routers, interfaces to wired control busses, gateways to wireless communication networks, gateways to external networks or systems, and others. Still other examples of provider devices 18 include devices whose primary function is to store real-time process data and other related data that is accumulated throughout the process control system 10 and optionally to cause the stored data to be transmitted for aggregation, consolidation, and/or historization.

A second group or type of nodes 20, referred to herein as "user interface nodes," "user interface components," or user interface devices," includes nodes or devices, each of which has an integral user interface, via which a user or operator may interact with the process control system or process plant 10 to perform activities related to the process plant 10 (e.g., configure, view, monitor, test, analyze, diagnose, order, plan, schedule, annotate, and/or other activities). Examples of these user interface nodes or devices 20 include mobile or stationary computing devices, workstations, handheld devices, tablets, surface computing devices, diagnostic devices, tools, and any other computing device having a processor, a memory, and an integral user interface. Integrated user interfaces may include a screen, a keyboard, keypad, mouse, buttons, touch screen, touch pad, biometric interface, speakers and microphones, cameras, and/or any other user interface technology, and each user interface node 20 includes one or more integrated user interfaces. User interface nodes 20 may include a direct connection to a process control network 12, 15, or may include in indirect connection to a process control network 12, 15, e.g., via the Internet 26b or other network 26a, 26b via an access point or a gateway. User interface nodes 20 may communicatively connect to the process control system network 12, 15 in a wired manner and/or in a wireless manner. In some embodiments, a user interface node 20 connects to the process control system network 12, 15 in an ad-hoc manner. Such ad-hoc connections are typically established using a wireless communication protocol, e.g., an IEEE 802.11 compliant wireless local area network protocol, a mobile communication protocol such as WiMAX, LTE or other ITU-R compatible protocol, a short-wavelength radio communication protocol such as near field communications (NFC) or Bluetooth, a process control wireless protocol such as WirelessHART or a wireless big data process control protocol, or some other suitable wireless communication protocol.

In some embodiments, a device is both a provider device 18 and a user interface device 20, such as when a provider device 18 includes an integral user interface.

Of course, the plurality of nodes that are communicatively connected to the networks 12, 15 of the process control system or plant 10 is not limited to only provider nodes 18 and user interface nodes 20. One or more other types of nodes 22 may also be included in the plurality of nodes. Examples of such nodes 22 include a device that is external to the process plant 10 (e.g., a computer at a lab system or a materials handling system) and that is communicatively connected to a network 12, 15 of the system 10, and a remotely controlled, mobile diagnostic device. Further, a node or device 22 may be communicatively connected to a network 12, 15 of the system 10 via a direct or an indirect connection, and/or via a wired or a wireless connection. In some embodiments, the group of other nodes 22 is omitted from the process control system 10.

Figure 2:
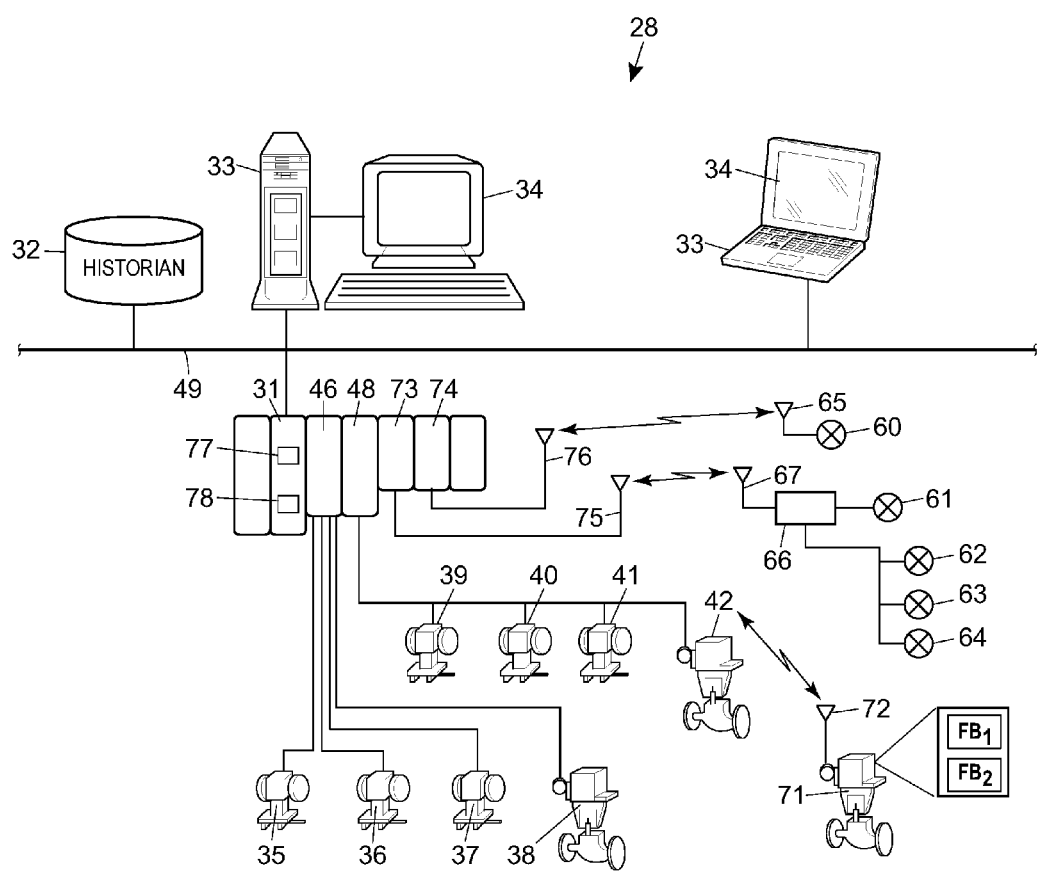
FIG. 2 is a schematic representation of a portion, of the process control system of FIG. 1, that is not configured to support process control big data and to which a device or component may communicatively connect.

FIG. 2 is a schematic representation of an example of a portion 28 of the network 15 of FIG. 1. As previously mentioned, the network 15 does not support process control big data in the process plant 10, and one or more devices or components 18-22 may communicatively connect to the network 15. Generally, the portion 28 of the non-big data network 15 includes one or more wired and/or wireless networks, at least one of which uses a process control protocol to carry data to and from process control devices, such as controllers, I/O devices, and field devices, that operate on the data and perform physical functions to control a process within the process plant 10. In an example, the portion 28 is a legacy process control network that utilizes non-big data protocols such as Ethernet, EthernetIP, DeviceNet, CompNet, ControlNet, Modbus, Fieldbus, HART®, WirelessHART®, Wi-Fi, etc. As shown in FIG. 2, the portion 28 of the process control system 10 includes at least one process controller 31 connected to a data historian 32 and to one or more host workstations or computers 33

(which may be any type of personal computers, workstations, etc.), each having a display screen 34. The process controller 31 is also connected to field devices 35-42 via input/output (I/O) cards 46 and 48. The data historian 32 may be any desired type of data collection unit having any desired type of memory and any desired or known software, hardware or firmware for storing data and, while being illustrated as a separate device, may instead or in addition be part of one of the workstations 33 or another computer device, such as a server. The controller 31, which may be, by way of example, a DeltaV™ controller sold by Emerson Process Management, is communicatively connected to the host computers 33 and to the data historian 32 via a communication network 49 which may be, for example, a wired or a wireless Ethernet connection.

The controller 31 is illustrated as being communicatively connected to the field devices 35-42 using a hardwired communication scheme which may include the use of any desired hardware, software and/or firmware to implement hardwired communications, including, for example, standard 4-20 mA communications, and/or any communications using any smart communication protocol such as the FOUNDATION® Fieldbus communication protocol, the HART® communication protocol, etc. The field devices 35-42 may be any types of devices, such as sensors, valves, transmitters, positioners, etc., while the I/O cards 46 and 48 may be any types of I/O devices conforming to any desired communication or controller protocol. In the embodiment illustrated in FIG. 2, the field devices 35-38 are standard 4-20 mA devices that communicate over analog lines to the I/O card 46, while the field devices 39-42 are smart devices, such as Fieldbus field devices, that communicate over a digital bus to the I/O card 48 using Fieldbus protocol communications. Of course, the field devices 35-42 may conform to any other desired standard(s) or protocols, including any standards or protocols developed in the future.

In addition, the portion 28 of the process control system 10 includes a number of wireless field devices 60-64 and 71 that are disposed in the plant to be controlled, to thereby control the process. The field devices 60-64 are depicted in FIG. 2 as being transmitters (e.g., process variable sensors) and the field device 71 is depicted as being a valve. However, these field devices may be any other desired types of devices disposed within a process to implement physical control activities or to measure physical parameters within the process to control the process within the plant 10. Wireless communications may be established between the controller 31 and the field devices 60-64 and 71 using any desired wireless communication equipment, including hardware, software, firmware, or any combination thereof now known or later developed. In the example case illustrated in FIG. 2, an antenna 65 is coupled to and is dedicated to perform wireless communications for the field device 60, while a wireless router or other module 66 having an antenna 67 is coupled to collectively handle wireless communications for the field devices 61-64. Likewise, an antenna 72 is coupled to the valve 71 to perform wireless communications for the valve 71. The field devices or associated hardware 60-64, 66 and 71 may implement protocol stack operations used by an appropriate wireless communication protocol (in an example, the WirelessHART® protocol, WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols) to receive, decode, route, encode and send wireless signals via the antennas 65, 67 and 72 to implement wireless communications between the controller 31 and the transmitters 60-64 and the valve 71.

If desired, the field devices or transmitters 60-64 may constitute the sole link between various process devices and the controller 31 and, as such, are relied upon to send accurate signals to the controller 31 to ensure that product quality and flow are not compromised. Additionally, the valve or other field device 71 may provide measurements made by sensors within the valve 71 or may provide other data generated by or computed by the valve 71 to the controller 31 as part of the operation of the valve 71, including data collected by, computed by or otherwise generated by the function blocks FB1 and FB2 executed within the valve 71. Of course, the valve 71 may also receive control signals from the controller 31 to effect physical parameters, e.g., flow, within the plant.

The controller 31 is coupled to one or more I/O devices 73 and 74, each of which is connected to a respective antenna 75 and 76, and these I/O devices and antennas 73-76 operate as transmitters/receivers to perform wireless communications with the wireless field devices 61-64 and 71 via one or more wireless communication networks. The wireless communications between the field devices (e.g., the transmitters 60-64 and valve 71) may be performed using one or more known wireless communication protocols, such as the WirelessHART® protocol, the Ember protocol, a WiFi protocol, an IEEE wireless standard, etc., such as discussed above. Still further, the I/O devices 73 and 74 may implement protocol stack operations used by these communication protocols to receive, decode, route, encode and send wireless signals via the antennas 75 and 76 to implement wireless communications between the controller 31 and the transmitters 60-64 and the valve 71.

As illustrated in FIG. 2, the controller 31 includes a processor 77 that implements or oversees one or more process control routines (or any module, block, or subroutine thereof) stored in a memory 78. The process control routines stored in the memory 78 include or are associated with control loops being implemented within the process plant to control at least a portion of the process. Generally speaking, the controller 31 executes one or more control routines and communicates with the field devices 35-42, 60-64, and 71 (and optionally the host computers 33 and the data historian 32) to control a process in any desired manner(s). However, it should be noted that any control routines or modules described herein may have parts thereof implemented or executed in a distributed fashion across multiple devices. As a result, a control routine or a module may have portions implemented by different controllers, field devices (e.g., smart field devices) or other devices or other control elements, if so desired.

Likewise, the control routines or modules described herein to be implemented within the process control system 10 may take any form, including software, firmware, hardware, etc. Any device or element involved in providing such functionality may be generally referred to interchangeably herein as a "control element," "process control element," or "process control device," regardless of whether the software, firmware, or hardware associated therewith is disposed in a controller, a field device, or any other device (or collection of devices) within the process control system 10. Of course, a control module may be any part or portion of a process control system including, for example, a routine, a block or any element thereof, stored on any computer readable medium. Such control modules, control routines or any portions thereof may be implemented or executed by any element or device of the process control system 10, referred to herein generally as a control element. Moreover, control routines, which may be modules or any part of a control procedure such as a subroutine, parts of a subroutine (such as lines of code), etc., may be implemented in any desired software format, such as object oriented programming, ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. As a result, the controller 31 may be configured to implement a control strategy or control routine in any desired manner.

In some embodiments, the controller 31 implements a control strategy or scheme using what are commonly referred to as function blocks, wherein each function block is an object or other part (e.g., a subroutine) of an overall control routine that operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, model predictive control, etc., or an output function which controls the operation of some device, such as a valve, to perform some physical function within the process control system 10. Of course, hybrid and other types of function blocks exist and may be utilized herein. The function blocks may be stored in and executed by the controller 31, which is typically the case when the function blocks are used for, or are associated with standard 4-20 mA devices and some types of smart field devices such as HART® devices. Alternatively or additionally, the function blocks may be stored in and implemented by the field devices themselves, I/O devices, or other control elements of the process control system 10, which may be the case with systems utilizing Fieldbus devices. While the description of the control system 10 is generally provided herein using a function block control strategy, the disclosed techniques and system may also be implemented or designed using other conventions or programming paradigms.

Figure 3:
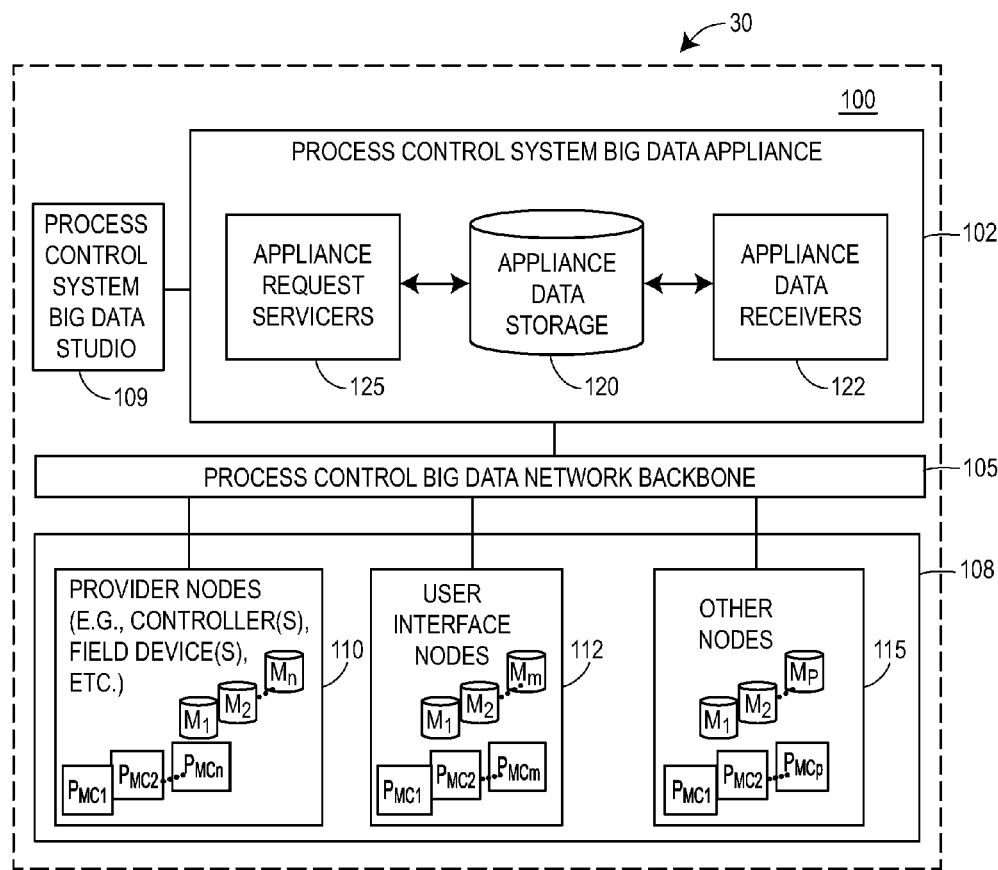
FIG. 3 is a block diagram of a portion, of the process control system of FIG. 1, that is configured to support process control big data and to which a device or component may communicatively connect.

FIG. 3 is a block diagram of an example portion 30 of the process control system 10 that is configured to support process control data (e.g., the network 12), and to which devices and/or components may communicatively connect. In particular, FIG. 3 illustrates an example process control system big data network 100 for the process plant or process control system 10. The example process control system big data network 100 includes a process control system big data network backbone 105 and a plurality of nodes 108 that are communicatively connected to the backbone 105. In some embodiments, at least one of the nodes 108 is a centralized big data appliance 102; however, the big data network portion 12 of the process control system 10 is not required to include a single, centralized big data appliance 102. For example, multiple distributed big data appliances 102 may be distributed within the plant, and/or individual big data nodes each may perform distributed big data functions.

In the example process control system big data network 100, process-related data, plant-related data, and other types of data are collected, cached, and/or stored at the plurality of nodes 108 as big data. In some configurations of the network 12, at least some of the collected, cached, and/or stored data is delivered, via the network backbone 105, to a centralized and/or distributed process control system big data apparatus or appliance 102 for long-term storage (e.g., "historization") and processing. In some configurations of the network 12, at least some of the collected, cached, and/or stored is maintained at the node 108 at which the data was collected for historization and processing. In an embodiment, at least some of the data may be delivered between nodes 108 of the network 100, e.g., to control a process in real-time.

In an embodiment, any type of data related to the process control system 10 is historized at the big data appliance 102 and/or at various other nodes 108. In an embodiment, all data that is generated, received, or observed by at least a subset of the nodes 108 that are communicatively connected to the network backbone 105 is collected and caused to be stored at the process control system big data appliance 102 (e.g., "centralized big data"). Additionally or alternatively, all data related to the process control system 10 that is generated, received, or observed by a particular node 108 is collected and stored at the particular node 108 (e.g., "distributed big data").

In an embodiment, process data is collected and stored. For example, real-time process data such as continuous, batch, measurement and event data that is generated as a result of a process being controlled in the process plant 10 (and, in some cases, is indicative of an effect of a real-time execution of the process) is collected and stored. Process definition, arrangement or set-up data such as configuration data and/or batch recipe data is collected and stored, and/or data corresponding to the configuration, execution and results of process diagnostics is collected and stored. Other types of process data may also be collected and stored.

In an embodiment, data highway traffic and network management data of the backbone 105 and of various other communication networks of the process plant 10 is collected and stored. In an embodiment, user-related data such as data related to user traffic, login attempts, queries and instructions is collected and stored. Text data (e.g., logs, operating procedures, manuals, etc.), spatial data (e.g., location-based data) and multi-media data (e.g., closed circuit TV, video clips, etc.) may be collected and stored.

In an embodiment, data that is related to the process plant 10 (e.g., to physical equipment included in the process plant 10 such as machines and devices) but that may not be generated by applications that directly configure, control, or diagnose a process is collected and stored. For example, vibration data and steam trap data may be collected and stored, and/or plant safety data may be collected and stored. For example, data indicative of a value of a parameter corresponding to plant safety (e.g., corrosion data, gas detection data, etc.) is stored, and/or data indicative of an event corresponding to plant safety is stored. Data corresponding to the health of machines, plant equipment and/or devices may be collected and stored. For example, equipment data (e.g., pump health data determined based on vibration data and other data), and/or data corresponding to the configuration, execution and results of equipment, machine, and/or device diagnostics is collected and stored. In some embodiments, data generated by or transmitted to entities external to the process plant 10 is collected and stored, such as data related to costs of raw materials, expected arrival times of parts or equipment, weather data, and other external data.

As previously discussed above with respect to FIG. 1, the process control big data network 100 may include a plurality of nodes 18, 20, 22, which are collectively denoted in FIG. 3 by the reference 108. In FIG. 3, a first group of big data nodes 110 are provider nodes 18 that are communicatively connected to the process control big data network backbone 105, e.g., in a direct or indirect manner. The big data provider nodes 110 may be wired or wireless devices. Typically, the big data provider devices 110 do not have an integral user interface, although some of the provider devices 100 may have the capability to be in communicative connection with a user computing device or user interface, e.g., by communicating over a wired or wireless communication link, or by plugging a user interface device into a port of the provider device 110.

Additionally, in FIG. 3, a second group of big data nodes 112 are user interface nodes 20 that are communicatively connected to the process control big data network backbone 105, e.g., in a direct or indirect manner, and/or in a wired manner and/or in a wireless manner. In some embodiments, a user interface node 112 connects to the network backbone 105 in an ad-hoc manner. Further, in some configurations of the process plant 10, one or more other types of big data nodes 115 are included in the plurality of nodes 108. For example, a node of a system that is external to the process plant 10 (e.g., a lab system or a materials handling system) may be communicatively connected to the network backbone 105 of the system 100. Similar to the provider nodes 110, a big data user interface node 112 or other big data node 115 may be communicatively connected to the backbone 105 via a direct or an indirect connection and/or via a wired or a wireless connection.

Any number of the big data nodes 108 (e.g., zero nodes, one node, or more than one node) each includes respective memory storage (denoted in FIG. 3 by the icons $M_x$) to store (and/or, in some cases, cache) tasks, measurements, events, and other data in real-time. In an embodiment, a memory storage $M_x$ comprises high density memory storage technology, for example, solid state drive memory, semiconductor memory, optical memory, molecular memory, biological memory, or any other suitable high density memory technology. In some embodiments, the memory storage $M_x$ also includes flash memory. The memory storage $M_x$ (and, in some cases, the flash memory) is configured to store and/or cache data that is generated by, received at, or otherwise observed by its respective node 108. The flash memory $M_x$ of at least some of the nodes 108 (e.g., a controller device) may also store snapshots of node configuration, batch recipes, and/or other data. In an embodiment of the process control system big data network 100, all of the nodes 110, 112 and any number of the nodes 115 include high density memory storage $M_x$. It is understood that different types or technologies of high density memory storage $M_x$ may be utilized across the set of nodes 108, or across a subset of nodes included in the set of nodes 108.

In an embodiment, any number of the nodes 108 (for example, zero nodes, one node, or more than one node) each includes respective multi-core hardware (e.g., a multi-core processor or another type of parallel processor), as denoted in the FIG. 3 by the icons $P_{MCX}$. At least some of the nodes 108 may designate one of the cores of its respective processor $P_{MCX}$ for storing real-time data at the node. Additionally or alternatively, at least some of the nodes 108 may designate more than one of the multiple cores of its respective multi-core processor $P_{MCX}$ for caching real-time data (and, in some cases, for causing the cached real-time data to be stored at big data appliance 102). In some embodiments, the one or more designated cores for storing real-time data and the one or more designated cores for caching real-time are exclusively designated as such (e.g., the one or more designated cores perform no other processing except processing related to storing and processing big data). In an embodiment, at least some of the nodes 108 each designates one of its cores to perform operations to control a process in the process plant 10. In an embodiment, one or more cores are designated exclusively for performing operations to control a process, and are not be used to process big data. It is understood that different types or technologies of multi-core processors $P_{MCX}$ may be utilized across the set of nodes 108, or across a subset of nodes of the set of nodes 108. In an embodiment of the process control system big data network 100, all of the nodes 110, 112 and any number of the nodes 115 include some type of multi-core processor $P_{MCX}$.

It is noted, though, that while FIG. 3 illustrates the nodes 108 as each including both a multi-core processor $P_{MCX}$ and a high density memory $M_x$, each of the nodes 108 is not required to include both a multi-core processor $P_{MCX}$ and a high density memory $M_x$. For example, some of the nodes 108 may include only a multi-core processor $P_{MCX}$ and not a high density memory $M_x$, some of the nodes 108 may include only a high density memory $M_x$ and not a multi-core processor $P_{MCX}$, some of the nodes 108 may include both a multi-core processor $P_{MCX}$ and a high density memory $M_x$, and/or some of the nodes 108 may include neither a multi-core processor PMCX nor a high density memory $M_x$.

Examples of real-time data that may be collected, cached, and/or stored by provider nodes or devices 110 include measurement data, configuration data, batch data, event data, and/or continuous data. For instance, real-time data corresponding to configurations, batch recipes, setpoints, outputs, rates, control actions, diagnostics, alarms, events and/or changes thereto may be collected. Other examples of real-time data include process models, statistics, status data, and network and plant management data. Examples of real-time data that may be collected, cached, and/or stored by user interface nodes or devices 112 include, for example, user logins, user queries, data captured by a user (e.g., by camera, audio, or video recording device), user commands, creation, modification or deletion of files, a physical or spatial location of a user interface node or device, results of a diagnostic or test performed by the user interface device 112, and other actions or activities initiated by or related to a user interacting with a user interface node 112.

Collected, cached, and/or stored data may be dynamic or static data. For example, collected, cached, and/or stored data may include, for example, database data, streaming data, and/or transactional data. Generally, any data that a node 108 generates, receives, or observes may be collected, cached, and/or stored with a corresponding time stamp or indication of a time of collection/caching. In a preferred embodiment, all data that a node 108 generates, receives, or observes is collected, cached, and/or stored in its memory storage (e.g., high density memory storage $M_x$) with a respective indication of a time of each datum's collection/caching (e.g., a time stamp).

Thus, in the big data process control network 100, the identity of data that is collected, cached, and/or stored at the nodes or devices 108 and/or at the big data appliance 102 need not be configured into the devices 108 a priori. Further, the rate at which data is collected at and delivered from the nodes 108 also need not be configured, selected or defined. Instead, the nodes 110, 112 (and, optionally, at least one of the other nodes 115) of the process control big data system 100 automatically collects all data that is generated by, received at, or obtained by the node at the rate at which the data is generated, received or obtained, and automatically causes the collected data to be stored locally at the node 110, 112 and/or at the big data appliance 102.

Figure 4:
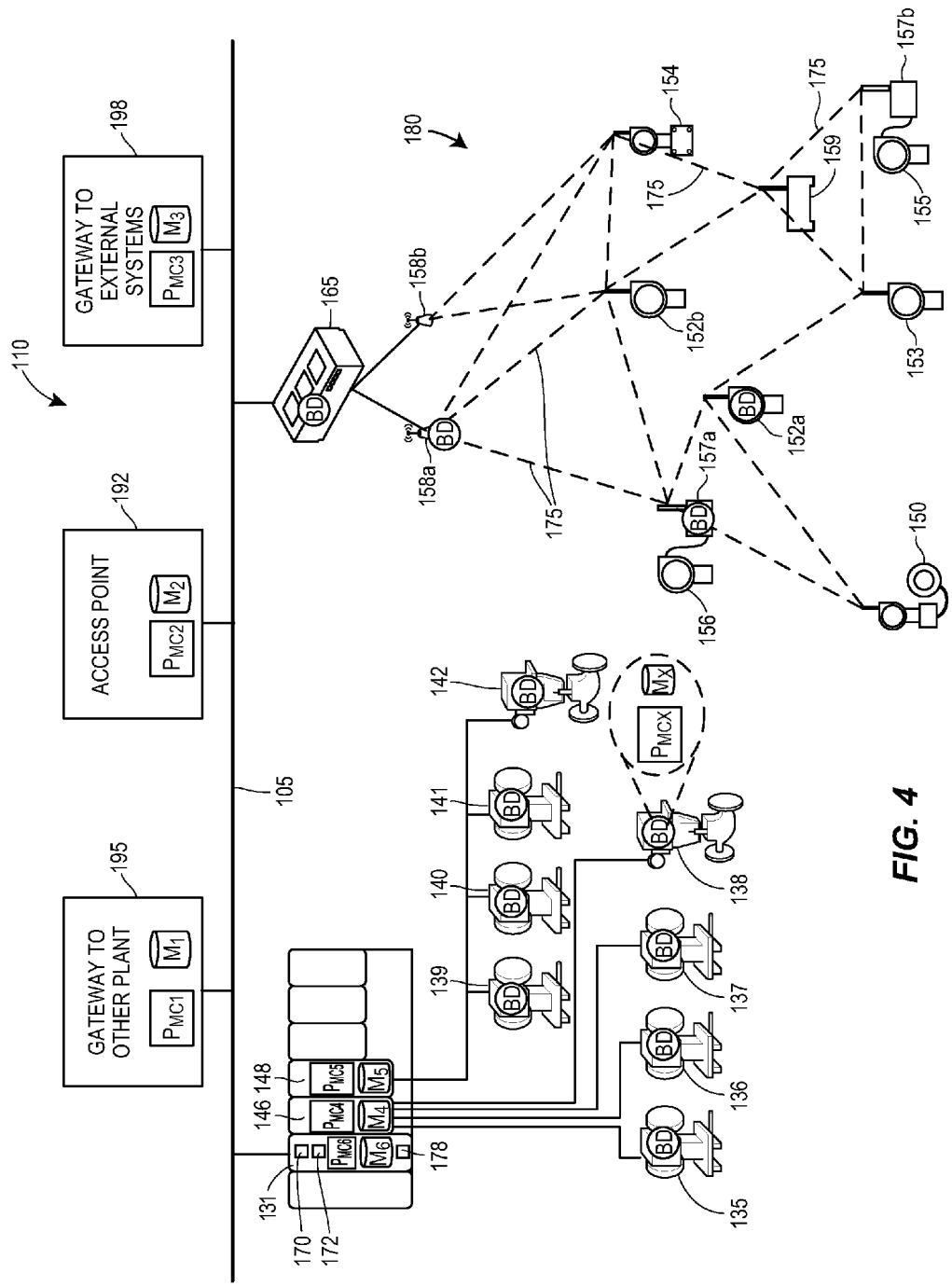
FIG. 4 provides an example configuration of various provider nodes connected to a process control big data network backbone.

FIG. 4 illustrates an example configuration of various provider nodes 110 connected to the process control big data network backbone 105. As previously discussed, provider nodes 110 include devices whose main function is to automatically generate and/or receive process control data that is used to perform functions to control a process in real-time in the process plant environment 10, such as process controllers, field devices and I/O devices. In a process plant environment 10, process controllers receive signals indicative of process measurements made by field devices, process this information to implement a control routine, and generate control signals that are sent over wired or wireless communication links to other field devices to control the operation of a process in the plant 10. Typically, at least one field device performs a physical function (e.g., opening or closing a valve, increase or decrease a temperature, etc.) to control the operation of a process, and some types of field devices may communicate with controllers using I/O devices. Process controllers, field devices, and I/O devices may be wired or wireless, and any number and combination of wired and wireless process controllers, field devices and I/O devices may be provider nodes 110 of the process control big data network 100.

For example, FIG. 4 includes a process controller 131 that is communicatively connected to wired field devices 135-142 via input/output (I/O) cards 146 and 148, and that is communicatively connected to field devices 150-156 (some of which are wireless 150-154 and some of which are not wireless 155, 156) via a wireless gateway 165 and the network backbone 105. (In another embodiment, though, the controller 131 is communicatively connected to the wireless gateway 165 using a communications network other than the backbone 105, such as by using another wired or a wireless communication link.) In FIG. 4, the controller 131 and the I/O cards 146, 148 are shown as being nodes 110 of the process control system big data network 100, and the controller 131 is directly connected to the process control big data network backbone 105.

The controller 131, which may be, by way of example, the DeltaV™ controller sold by Emerson Process Management, may operate to implement a batch process or a continuous process using at least some of the field devices 135-142 and 150-156. The controller 131 may be communicatively connected to the field devices 135-142 and 150-156 using any desired hardware and software associated with, for example, standard 4-20 ma devices, I/O cards 146, 148, and/or any smart communication protocol such as the FOUNDATION® Fieldbus protocol, the HART® protocol, the WirelessHART® protocol, etc. In some cases, the controller 131 is additionally or alternatively communicatively connected with at least some of the field devices 135-142 and 150-156 using the big data network backbone 105. In the embodiment illustrated in FIG. 4, the controller 131, the field devices 135-142, 155, 156 and the I/O cards 146, 148 are wired devices, and the field devices 150-154 are wireless field devices. Of course, the wired field devices 135-142, 155, 156 and wireless field devices 150-154 could conform to any other desired standard(s) or protocols, such as any wired or wireless protocols, including any standards or protocols developed in the future.

The controller 131 of FIG. 4 includes a processor 170 that implements or oversees one or more process control routines (stored in a memory 172), which may include control loops.

The processor 170 may communicate with the field devices 135-142 and 150-156 and with other nodes (e.g., nodes 110, 112, 115) that are communicatively connected to the backbone 105. It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 10 may take any form, including software, firmware, hardware, etc. Control routines may be implemented in any desired software format, such as using object oriented programming, ladder logic, sequential function charts, function block diagrams, or using any other software programming language or design paradigm. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 31 may be configured to implement a control strategy or control routine in any desired manner.

In some embodiments, the controller 131 implements a control strategy using what are commonly referred to as function blocks, wherein each function block is an object or other part (e.g., a subroutine) of an overall control routine and operates in conjunction with other function blocks (via communications called links) to implement process control loops within the process control system 10. Control based function blocks typically perform one of an input function, such as that associated with a transmitter, a sensor or other process parameter measurement device, a control function, such as that associated with a control routine that performs PID, fuzzy logic, model predictive control, etc., or an output function which controls the operation of some device, such as a valve, to perform some physical function within the process control system 10. Of course, hybrid and other types of function blocks exist. Function blocks may be stored in and executed by the controller 131, which is typically the case when these function blocks are used for, or are associated with standard 4-20 ma devices and some types of smart field devices such as HART devices, or may be stored in and implemented by the field devices themselves, which can be the case with Fieldbus devices. The controller 131 may include one or more control routines 178 that may implement one or more control loops. Each control loop is typically referred to as a control module, and may be performed by executing one or more of the function blocks.

The wired field devices 135-142, 155, 156 may be any types of devices, such as sensors, valves, transmitters, positioners, etc., while the I/O cards 146 and 148 may be any types of I/O devices conforming to any desired communication or controller protocol. In the embodiment illustrated in FIG. 4, the field devices 135-138 are standard 4-20 ma devices or HART devices that communicate over analog lines or combined analog and digital lines to the I/O card 146, while the field devices 139-142 are smart devices, such as FOUNDATION® Fieldbus field devices, that communicate over a digital bus to the I/O card 148 using a Fieldbus communications protocol. In some embodiments, though, at least some of the wired field devices 135-142 and/or at least some of the I/O cards 146, 148 communicate with the controller 131 using the big data network backbone 105. In some embodiments, at least some of the wired field devices 135-142 and/or at least some of the I/O cards 146, 148 are nodes 110 of the process control system big data network 100.

In the embodiment shown in FIG. 4, the wireless field devices 150-154 communicate in a wireless network 180 using a wireless protocol, such as the WirelessHART protocol. Such wireless field devices 150-154 may directly communicate with one or more other nodes 108 of the process control big data network 100 that are also configured to communicate wirelessly (using the same or a different wireless protocol, for example). To communicate with one or more other nodes that are not configured to communicate wirelessly, the wireless field devices 150-154 may utilize the wireless gateway 165 connected to the backbone 105 or to another process control communication network. In some embodiments, at least some of the wireless field devices 150-154 and the wireless gateway 165 are nodes 110 of the process control system big data network 100.

The wireless gateway 165 is an example of a provider device 110 that may provide access to various wireless devices of a wireless communication network 180 included in the process plant 10. In particular, the wireless gateway 165 provides communicative coupling between the wireless devices 150-154, 157-159, the wired devices 135-142, 155, 156, and/or other nodes of the process control big data network 100 (including the controller 131 of FIG. 4). For example, the wireless gateway 165 may provide communicative coupling by using the big data network backbone 105 and/or by using one or more other communications networks of the process plant 10.

The wireless gateway 165 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 165 may translate commands between wired and wireless protocols that do not share any protocol layers. In addition to protocol and command conversion, the wireless gateway 165 may provide synchronized clocking used by time slots and superframes (sets of communication time slots spaced equally in time) of a scheduling scheme associated with the wireless protocol implemented in the wireless network 180. Furthermore, the wireless gateway 165 may provide network management and administrative functions for the wireless network 180, such as resource management, performance adjustments, network fault mitigation, monitoring traffic, security, and the like. The wireless gateway 165 may be a node 110 of the process control system big data network 100.

Similar to the wired field devices 135-142, the wireless field devices 150-154 of the wireless network 180 may perform physical control functions within the process plant 10, e.g., opening or closing valves or take measurements of process parameters. The wireless field devices 150-154, however, are configured to communicate using the wireless protocol of the network 180. As such, the wireless field devices 150-154, the wireless gateway 165, and other wireless nodes 157-159 of the wireless network 180 are producers and consumers of wireless communication packets.

In some scenarios, the wireless network 180 may include non-wireless devices. For example, a field device 155 of FIG. 4 may be a legacy 4-20 mA device and a field device 156 may be a traditional wired HART device. To communicate within the network 180, the field devices 155 and 156 may each be connected to the wireless communication network 180 via a wireless adaptor (WA) 157a or 157b.

Additionally, the wireless adaptors 157a, 157b may support other communication protocols such as Foundation® Fieldbus, PROFIBUS, DeviceNet, etc. Furthermore, the wireless network 180 may include one or more network access points 158a, 158b, which may be separate physical devices in wired communication with the wireless gateway 165 or may be provided with the wireless gateway 165 as an integral device. The wireless network 180 may also include one or more routers 159 to forward packets from one wireless device to another wireless device within the wireless communication network 180. The wireless devices 150-154 and 157-159 may communicate with each other and with the wireless gateway 165 over wireless links 175 of the wireless communication network 180.

Accordingly, FIG. 4 includes several examples of provider devices 110 which primarily serve to provide network routing functionality and administration to various networks of the process control system. For example, the wireless gateway 165, the access points 158a, 158b, and the router 159 include functionality to route wireless packets in the wireless communication network 180. The wireless gateway 165 performs traffic management and administrative functions for the wireless network 180, as well as routes traffic to and from wired networks that are in communicative connection with the wireless network 180. The wireless network 180 may utilize a wireless process control protocol that specifically supports process control messages and functions, such as WirelessHART.

The provider nodes 110 of the process control big data network 100, though, may also include other nodes that communicate using other wireless protocols. For example, the provider nodes 110 may include one or more wireless access points 192 that utilize other wireless protocols which may or may not be different from the wireless protocol utilized in the process control wireless network 180. For example, the wireless access points 192 may utilize Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, and/or other wireless communication protocols. Typically, such wireless access points 192 allow handheld or other portable computing devices (e.g., user interface devices 112) to communicative over a respective wireless network that is different from the wireless network 180 and that supports a different wireless protocol than the wireless network 180. In some scenarios, in addition to portable computing devices, one or more process control devices (e.g., controller 31, field devices 135-142, or wireless devices 150-154) may also communicate using the wireless supported by the access points 192.

Additionally or alternatively, the provider nodes 110 may include one or more gateways 195, 198 to systems that are external to the immediate process control system or plant 10, and yet are associated with an enterprise that owns and/or operates the plant 10. Typically, such systems are customers or suppliers of information generated or operated on by the process control system or plant 10, and may be interconnected via a private enterprise network, such as the private network 25a shown in FIG. 1. For example, a plant gateway node 195 may communicatively connect the immediate process plant 10 (having its own respective process control big data network backbone 105) with another process plant having its own respective process control big data network backbone. In an embodiment, a single process control big data network backbone 105 may service multiple process plants or process control environments.

In another example, a plant gateway node 195 may communicatively connect the immediate process plant 10 to a legacy or prior art process plant that does not include a process control big data network 100 or backbone 105. In this example, the plant gateway node 195 may convert or translate messages between a protocol utilized by the process control big data backbone 105 of the plant 10 and a different protocol utilized by the legacy system (e.g., Ethernet, Profibus, Fieldbus, DeviceNet, etc.).

The provider nodes 110 may include one or more external system gateway nodes 198 to communicatively connect the process control big data network 100 with the network of an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems. For example, one or more external systems may be accessed via a private network (e.g., the private network 26a of FIG. 1), and/or one or more external systems are accessed via a public network (e.g., the public network 26b of FIG. 1).

Additionally, although FIG. 4 only illustrates a single controller 131 with a finite number of field devices 135-142 and 150-156, this is only an illustrative and non-limiting embodiment. Any number of controllers 131 may be included in the provider nodes 110 of the process control big data network 100, and any of the controllers 131 may communicate with any number of wired or wireless field devices 135-142, 150-156 to control a process in the plant 10. Furthermore, the process plant 10 may also include any number of wireless gateways 165, routers 159, access points 158, wireless process control communication networks 180, access points 192, and/or gateways 195, 198.

As previously discussed, one or more of the provider nodes 110 may include a respective multi-core processor $P_{MCX}$, a respective high density memory storage $M_x$, or both a respective multi-core processor $P_{MCX}$ and a respective high density memory storage $M_x$ (denoted in FIG. 4 by the icon BD). Each provider node 100 may utilize its memory storage $M_x$ (and, in some embodiments, its flash memory) to collect, store, and/or cache data. As previously discussed, in some process plants 10, at least some of the provider nodes 110 transmit stored and/or cached big data to a big data appliance 102 for historization, aggregation and/or consolidation, and/or at least some of the provider nodes 100 maintain big data locally for historization, aggregation, and/or consolidation.

With further regard to FIG. 4, the process control system big data network backbone 105 includes a plurality of networked computing devices or switches that are configured to route packets to/from various nodes of the process control system big data network 100 and to/from the process control big data appliance 102, if included in the network 100. The plurality of networked computing devices of the backbone 105 may be interconnected by any number of wireless and/or wired links. In an embodiment, the process control system big data network backbone 105 includes one or more firewall devices.

The big data network backbone 105 supports one or more suitable routing protocols, e.g., protocols included in the Internet Protocol (IP) suite (e.g., UPD (User Datagram Protocol), TCP (Transmission Control Protocol), Ethernet, etc.), or other suitable routing protocols. In an embodiment, at least some of the nodes utilize a streaming protocol such as the Stream Control Transmission Protocol (SCTP) to stream cached data from the nodes to the process control big data appliance 102 via the network backbone 105. In an embodiment, a routing protocol supported by the big data network backbone 105 is a process-control specific routing protocol for process control big data. Typically, each node 108 included in the process data big data network 100 may support at least an application layer (and, for some nodes, additional layers) of the routing protocol(s) supported by the backbone 105. In an embodiment, each node 108 is uniquely identified within the process control system big data network 100, e.g., by a unique network address.

In an embodiment, at least a portion of the process control system big data network 100 is an ad-hoc network. As such, at least some of the nodes 108 may connect to the network backbone 105 (or to another node of the network 100) in an ad-hoc manner. In an embodiment, each node that requests to join the network 100 must be authenticated. Authentication is discussed in more detail in later sections.

Returning to FIG. 3, each node 108 at which big data is stored (e.g., the big data appliance 102 and/or one or more other nodes 108) includes a unitary, logical data storage area (e.g., $M_x$) having a structure that supports the storage of all types of process control system related data. For example, each entry, data point, or observation stored at the logical data storage area (e.g., $M_x$) may include an indication of the identity of the data (e.g., source, device, tag, location, etc.), a content of the data (e.g., measurement, value, etc.), and a time stamp indicating a time at which the data was collected, generated, received or observed. As such, these entries, data points, or observations are referred to herein as "time-series data." The data may be stored in the data storage area of the node 108 using a common format including a schema that supports scalable storage, streamed data, and low-latency queries, for example.

In an embodiment, the schema may include storing multiple observations in each row, and using a row-key with a custom hash to filter the data in the row. The hash is based on the time stamp and a tag, in an embodiment. For example, the hash may be a rounded value of the time stamp, and the tag may correspond to an event or an entity of or related to the process control system. In an embodiment, metadata corresponding to each row or to a group of rows may also be stored in the data storage area $M_x$, either integrally with the time-series data or separately from the time-series data. For example, the metadata may be stored in a schema-less manner separately from the time-series data.

In an embodiment, the schema used for storing data at the appliance data storage $M_x$ is common across the big data storage appliance 102 and at least one of the nodes 108. Accordingly, in this embodiment, the schema is maintained when data is transmitted from the local storage areas $M_x$ of the nodes across the backbone 105 to the process control system big data appliance data storage 120.

Figure 5A:
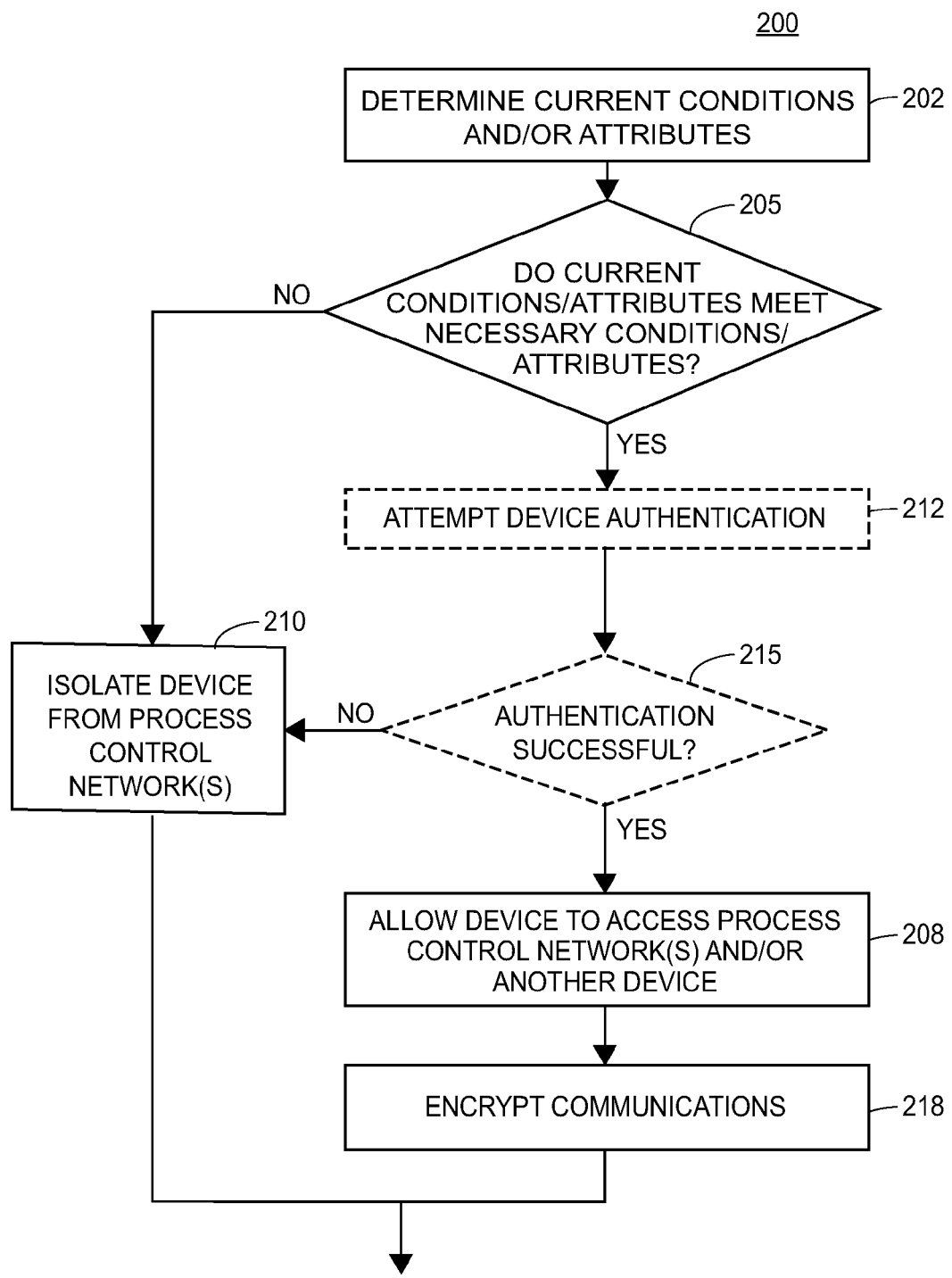
FIG. 5A is a flow diagram of an example method for securing devices in a process control system or plant.

Referring again to FIG. 1, and as discussed above, the techniques, methods, systems and devices disclosed herein allow a device or component 18, 20, 22 to be secured to a process plant 10, and/or allow the device or component 18, 20, 22 to securely access a process control network of the plant 10 (e.g., at least one of the networks 12, 15) so that the device or component 18, 20, 22 is safely included and utilized in or with the process control system or process plant 10 as intended or designated. To illustrate, FIG. 5A depicts an example method 200 of securing devices with a process control plant, such as the process control plant 10.

The method 200 may be used, for example, to secure a device (e.g., a "target" device) to safely and securely communicate with another device of the process plant 10. Additionally or alternatively, the method 200 may be used to secure a target device to safely and securely communicate with a process plant network 12, 15, e.g., with one or more devices included in the network 12, 15. The target device may be, for example, one of the devices 18, 20, 22. In some cases, at least part of the method 200 is performed by one of the devices 18, 20, 22 or by another device. In an embodiment, a processor of one of the devices 18, 20, 22 executes a set of computer-executable instructions stored on a memory of the device 18, 20, 22, and the execution of said instructions causes the device 18, 20, 22 to perform at least a portion of the method 200. For ease of discussion, the method 200 is discussed below with simultaneous reference to FIGS. 1-4, although this discussion is not limiting.

The method 200 includes determining a set of current conditions, characteristics, and/or attributes of an environment, area, or locale in which the target device 18, 20, 22 is located, and/or determining a set of current conditions, characteristics, and/or attributes of the target device itself (block 202). For example, upon initialization or boot-up of the target device 18, 20, 22 for the purposes of real-time operation in the process plant 10, and prior to the target device 18, 20, 22 communicating with any other device for purposes of real-time operation in the process plant 10 (e.g., prior to communicating with any other device to configure the device 18, 20, 22 and/or to transmit or receive data to cause a process to be controlled), the target device 18, 20, 22 detects or determines a set of current conditions, characteristics, or attributes of itself and/or of the environment in which the target device 18, 20, 22 finds itself located after initialization or boot-up. That is, after initialization or boot-up and prior to the target device 18, 20, 22 performing any actions required of the target device 18, 20, 22 so that the target device 18, 20, 22 may operate while a process is being controlled in the process plant 10, the target device 18, 20, 22 detects or determines a set of current conditions or attributes of itself and/or of the environment in which the target device 18, 20, 22 is presently located. Generally, the target device 18, 20, 22 performs said detection and/or determination without communicating with any other device of the process plant 10, although the target device 18, 20, 22 may, in some cases, communicate with another device that is ignorant or unaware of the process plant 10. For example, the target device 18, 20, 22 may communicate with GPS satellites to determine its geo-spatial location. Some target devices 18, 20, 22, though, may not communicate with any other device at all to perform the detection and/or determination of current conditions, characteristics, and/or attributes.

As previously discussed, the set of current conditions, characteristics, and/or attributes typically is descriptive or indicative of the target device 18, 20, 22 itself and/or of the environment in which the target device 18, 20, 22 is located. For example, a current condition or attribute of the target device 18, 20, 22 and/or its current environment may be a geo-spatial location of the target device 18, 20, 22 (which may be determined, for example, by a GPS transceiver included on the target device 18, 20, 22). Other examples of current conditions or attributes include a time and/or a date (e.g., a time and/or a date of the initialization/boot-up of the device 10 for real-time operation in the process plant 10) and a specific area of the process plant 10 in which the device 18, 20, 22 located upon initialization/boot-up. Still other examples of current conditions/attributes include an identity of a user of the device, an identity of the process plant 10 with which the device is to operate, an identity of an organizational entity operating the process plant 10 (typically, an organizational entity that has procured the target device 18, 20, 22 and/or intends the device to be used in or for the process plant 10), and/or an identity of a jurisdiction such as a county, state, province, or country in which the process plant 10 is located. Still further examples of current conditions/attributes include a type of the device (e.g., controller, I/O card, smart field device, router, gateway, access point, tablet, laptop, diagnostic monitor, etc.), a manufacturer of the device, a model of the device, and a type of real-time data to be transmitted by the target device 18, 20, 22 while the device 18, 20, 22 operates in the process plant 10. Typically, the target device 18, 20, 22 determines the set of current conditions/attributes of itself and/or of its present environment by operating a component of the target device 18, 20, 22 (e.g., a GPS transceiver, an altimeter, a gyroscope, a user log-on mechanism, etc.), and/or by reading data stored in the target device's 18, 20, 22 memory.

The method 200 includes determining whether or not the set of current conditions or attributes corresponding to the target device 18, 20, 22 and/or to its current location adhere to or comport with a set of conditions or attributes that are necessary to be met or to be present in order for the target device 18, 20, 22 to access the process control network 12, 15 or to access the other device (block 205). Ignoring for the moment the optional blocks 212 and 215 (as indicated by the dashed lines), if the set of current conditions or attributes adheres to the set of necessary conditions or attributes at the block 205, the target device 18, 20, 22 is considered secure and is allowed access to the process control network or networks 12, 15 or the other device (block 208). Accordingly, the secured device 18, 20, 22 may proceed to operate in real-time within the process plant 10 while the plant 10 is operating to control a process. For example, the secured device 18, 20, 22 may communicate with another device of the process plant 10; the secured device 18, 20, 22 may use or communicate over at least one of the networks 12, 15; the secured device 18, 20, 22 may receive and instantiate a configuration that specifies its real-time operating behavior from another device associated with the process plant 10; the secured device 18, 20, 22 may transmit or receive real-time data to cause the process to be controlled; etc. In an embodiment, some or all of the communications sent by the secured device 18, 20, 22 to the other device or via one or more of the networks 12, 15 is encrypted (block 218). For example, process data is encrypted and/or other data is encrypted.

At the block 205, if the set of current conditions or attributes does not adhere to or comport with the set of necessary conditions or attributes, then the target device 18, 20, 22 is not allowed access to (e.g., is denied access to or is prevented from accessing) the process control network or networks 12, 15 or the other device (block 210). That is, the device 18, 20, 22 is determined to be unsecure or not in the environment in which it is intended to be used. Accordingly, the device 18, 20, 22 isolates itself from the process plant 10 by not transmitting any communications via any of the process control networks 12, 15 or to the other device, and, in particular, by avoiding communication with any nodes of the networks 12, 15 or with the other device. If the device 18, 20, 22 includes an integral user interface, the device 18, 20, 22 may indicate its non-adherence thereon. Additionally or alternatively, the device 18, 20, 22 may indicate its non-adherence via a network that is not one of the process control networks 12, 15, such as a cellular communications network or other private or public computing network.

In an embodiment, indications of the set of necessary conditions and/or attributes are provisioned into or stored in a memory (e.g., a non-volatile memory) of the target device 18, 20, 22. For example the set of conditions and/or attributes may be provisioned at a factory, at a manufacturing site, at a staging site, or at any location or time prior to the target device 18, 20, 22 being initialized or booted up for use during real-time operations of a process plant 10. Provisioning the set of conditions and/or attributes may be performed using any known and/or suitable technique, such as by provisioning the set of conditions and/or attributes during manufacture, provisioning using an external tool, and/or provisioning using certificates.

In some cases, the set of conditions and/or attributes are included in a key that is provisioned into the target device 18, 20, 22, e.g., a key that is utilized for authenticating the device 18, 20, 22 to one or more networks of the process plant 10 and/or to a device included in the process plant 10. In an embodiment, the key that is provisioned into the device 18, 20, 22 is generated from a combination of a seed and key generation data, where the key generation data is indicative of the set of conditions, characteristics, and/or attributes corresponding to the device 18, 20, 22 and/or to the environment in which the device 18, 20, 22 may be located that are necessary in order for the device 18, 20, 22 to be allowed to access one or more networks of the process plant. For example, the seed is a randomly or pseudo-randomly generated number, and/or the seed is based on a device identifier (e.g., a HART or WirelessHART device ID); and the key generation data is a bit map, an array, a set of values, a code, one or more pointers to other data, or any other suitable arrangement of data indicative of a set of necessary conditions, characteristics, and/or attributes.

Further, the combination of the seed and the key generation data may be produced by combining the seed and the key generation data in any suitable manner. For example, the seed and the key generation data may be concatenated, combined using a function, and/or have at least a portion of their respective bits and/or bytes interwoven to form the combination. The combination of the seed and the key generation data is operated on (e.g., as a whole or integrally) to generate the key that is provisioned into the device 18, 20, 22. Key generation may be performed using any suitable or known key generation algorithm or function operating on the combination of the seed and the key generation data. For example, a public-key generation algorithm, a symmetric-key generation algorithm, a cryptographic hash function, a distributed key generation algorithm, and/or any other suitable or known key generation algorithm may be applied to the combined seed and key generation data. If desired, the method 200 includes encrypting the key generated by the key generation algorithm to form an encrypted key. Encryption may be performed using any suitable or known encryption technique, algorithm or function, such as a public key encryption algorithm, a symmetric key encryption algorithm, a PGP (Pretty Good Privacy) encryption algorithm, and/or any other suitable or known encryption algorithm, function or technique. In some cases, the key generation technique and the encryption technique are an integral technique that is applied to the combination of the seed and the key generation data.

Further, some encryption techniques or algorithms that may be utilized with the techniques described herein may generate, based on the contents of the key or message, a Message Integrity Code (MIC), checksum, or other type of verification code that may be attached to or included in the key or message. An example of such an encryption technique is the encryption algorithm used in WirelessHART protocol. Such a MIC, checksum, or other type of verification code may be used to verify or determine if contents of the message/key have been altered during transmission. For example, the receiver of the encrypted key may apply the same method or algorithm used by the sender to generate the MIC code, and the receiver may compare its generated MIC code with the MIC code embedded in the message/key. When such an encryption algorithm is used, either by itself or in addition to another encryption algorithm, resultant MIC codes may be included in messages that are exchanged between a host device of the encrypted key and a peer device in the process plant 10 to provide additional security.

In some situations, one or more sub-keys are also provisioned into the device 18, 20, 22. A sub-key, as is commonly known, is based on, derived from, bound to, dependent on, and/or otherwise associated with a key. A sub-key that is associated with a key may be generated based on sub-key generation data in a manner similar to the key generation techniques described above. For instance, a sub-key may be generated based on a combination of a seed and sub-key generation data. With respect to the techniques described herein, typically sub-key generation data and the key generation data are different data indicating respective, different necessary conditions/attributes. In some situations, sub-keys represent a further limiting condition or attribute of one or more conditions associated with a key (e.g., a sub-condition or a sub-attribute). For example, the key generation data for a particular key may indicate a necessary condition of a device being used by Process Plant Operating Company XYZ, and the sub-key generation data for a sub-key associated with the particular key may indicate a necessary condition of the device being used in Process Plant #123 operated by Operating Company XYZ. Furthermore, different parties or organizational entities may separately define key generation data and sub-key generation data. For example, the provider or supplier of the device 18, 20, 22 may define "Process Plant Operating Company XYZ" as key generation data, while Process Plant Operating Company XYZ may define "Process Plant #123" as sub-key generation data. Similar to keys, sub-keys may or may not be encrypted, e.g., by using the same or a different encryption algorithm than that utilized for an associated key. In some situations, a provider of sub-keys allows another party to access to some sub-keys while denying the other party from accessing other sub-keys. For example, Operating Company XYZ may enable or disable the ability of the manufacturer of the device 18, 20, 22 to access selected sub-keys even though the manufacturer provided the key from which the selected sub-keys are defined.

Accordingly, in some embodiments of block 205 of the method 200, determining whether or not the set of current conditions/attributes corresponding to the device 18, 20, 22 and/or to its current location adhere to or comport with the set of necessary conditions/attributes includes using the key and any sub-keys that have been provisioned into the device 18, 20, 22 to make said determination. In an embodiment, the provisioned key and one or more sub-keys (if present) are "reverse-engineered" or otherwise deconstructed to determine the key generation data from which the provisioned key was generated and, if applicable, to determine the sub-key generation data from which the provisioned sub-key was generated. For example, to recover the key generation data, the reverse of the key generation algorithm is first performed on the provisioned key, and then the results are deconstructed (e.g., the results are uncombined using the reverse of the function used to combine the seed and the key generation data) to recover the seed and the key generation data. In another example, a function or other algorithm may be applied to a provisioned key or sub-key to determine, extract or recover the key or sub-key generation data. As the recovered key generation data and (if applicable) sub-key generation data are indicative of the necessary conditions/attributes for device 18, 20, 22 access to the process control networks 12, 15, the necessary conditions/attributes indicated by the recovered key and sub-key generation data are compared against the current conditions/attributes to determine whether or not the device 18, 20, 22 is allowed to access the process control networks 12, 15 (block 205).

The techniques, methods, and apparatuses described herein not only allow devices to be secured to process plants and their networks, but additionally or alternatively allows devices to secured only to specific process plants during specific situations or conditions to mitigate theft, misuse, malicious use, plant breaches, loss of control of a process, the occurrence of catastrophic events such as explosions, fires, and/or loss of equipment and/or human life. Several example scenarios are provided below to illustrate the usage and benefits of the techniques.

In a first example, a first set of field devices is provisioned by their manufacturer or supplier with a key indicating that the devices are to be used only for a particular customer of the supplier, e.g., Oil Company A. Likewise, other sets of field devices are provisioned with indications of their respective customers, e.g., Paper Product Manufacturer B, Adhesive Manufacturer C, etc. Thus, by using at least some of the techniques described herein, each field device is only allowed to communicate with process control networks of their respective company, e.g., a field device provisioned for Oil Company A would be prevented from accessing a process control network of Paper Product Manufacturer B and being used in a process plant of Paper Product Manufacturer B, even if the field device was the desired make and model. As such, the device manufacturer is able to control undesired or illegal re-sales or transfers of devices between entities. More importantly, if a device provisioned for use in a legitimate customer's network is stolen by an entity or party having malicious intent for the device's use, or said provisioned device is illegally sold to the malicious party, the device is prevented from operating in the process networks of the malicious party. For example, a rogue group desiring to manufacture explosive material for nefarious purposes would not be able to use a device that has been provisioned for use only in Adhesive Manufacturer C's networks.

In another example of the present techniques, a process control system provider, e.g., Oil Company A, provisions a diagnostic tool with sub-key generation data indicative of an allowed time and location of use of the diagnostic tool. For example, the sub-key generation data may indicate that the diagnostic device is only to be allowed to access the network to perform diagnostics during the hours of 2 a.m. to 5 a.m. on weekends for a certain area of a process plant, and may indicate that the diagnostic device is allowed to access the network at any time in other areas of the process plant.

In yet another example, Oil Company A provisions certain process control devices for use in only certain locations. As such, if a process control device is inadvertently shipped to an incorrect location for installation, the process control device is prevented from accessing the network at that incorrect location and thus, a potential misuse of the device may be prevented.

In still another example, Oil Company A provides and provisions laptops or computing devices for operator use. Using the sub-key generation data, Oil Company A designates different sub-keys to automatically define and secure when, where, and by whom the laptop may be used to access the various process control networks and plants of Oil Company A. For example, Oil Company A may designate, using sub-key generation data, that when User 1144 logs on to a laptop to connect to a network of Oil Rig N, the laptop is allowed to wirelessly connect to the network of Oil Rig N. However, if User 1144 instead attempts to connect to a network of another oil rig, access may be denied.

As previously discussed, the keys and/or the sub-keys provisioned into a device 18, 20, 22 may be used to authenticate the device 18, 20, 22 to the one or more process control networks or to a particular device included in the process control plant in addition to being used to indicate one or more conditions and/or attributes that are necessary for the device 18, 20, 22 to be allowed to access the one or more networks of a process plant and/or to communicate with the particular device. For example, for embodiments in which provisioning of devices is accomplished using certificates, a certifying authority or agent (CA) manages public/private key pairs and certificates that may be used to verify the identities of various devices that indicate a desire to access process control networks. In some cases, a supplier or provider of devices (e.g., Emerson Process Management) serves as the CA for its devices, and manufacturers, process control system operating entities, and other downstream customers of the device supplier may request as many public/private key pairs from the device supplier as needed. As discussed above, based on key generation data, a key pair may be associated with a single device 18, 20, 22 or may be associated with a group of devices or items (e.g., a particular type of device, a particular set of people (e.g., by role, authorization, work group, etc.), a particular plant location or site, a particular area of a particular location or site, a particular manufacturer or customer, etc.). As such, a device supplier is able to pre-configure an out-of-the-box device with an appropriate key pair, which typically is included in a certificate issued by the device supplier (or by a designated CA). The key pair is presented for securing the device during the provisioning phase of the device, e.g., at some point after the device has left the supplier, and prior to the device being initialized for real-time use with the process plant of the customer receiving the device (e.g., a process plant operating entity). Further, in a similar manner, the downstream customer of the device supplier (such as a manufacturer, a process control system operating entity or other downstream customer of the device supplier, etc.) may serve as a localized CA of sub-keys associated with the device supplier keys and certificates corresponding thereto. The localized CA defines and provides sub-keys associated with the keys provided by the device supplier to manage security, asset tracking, risk, etc. in its own process plants and locales as desired. The localized CA, though, may be prevented from modifying or accessing any keys or information that were provided by the device supplier.

As such, returning now to the method 200 and to the optional blocks 212, 215, in some embodiments, after the target device 18, 20, 22 is determined as adhering to the necessary conditions and/or attributes for access (e.g., the "yes" leg of the block 205), the method 200 includes attempting to authenticate the target device 18, 20, 22 to the process control network 12, 15 or to the other device (block 212). For example, the device 18, 20, 22 attempts to authenticate to at least one of the networks 12, 15 or to the other device by utilizing a certificate that corresponds to the respective key of the device 18, 20, 22, e.g., for certificate exchange. In some cases, the device 18, 20, 22 attempts to authenticate by utilizing a certificate that corresponds to a respective sub-key of the device 18, 20, 22.

Figure 5B:
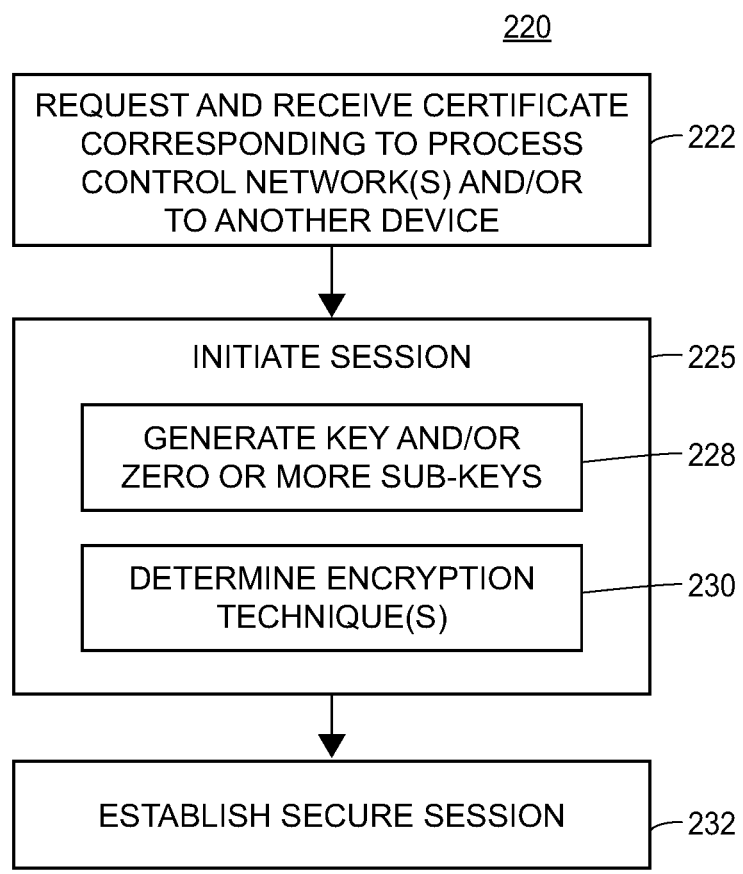
FIG. 5B is a flow diagram of an example method for authenticating a device to another device or network of a process plant.

An example embodiment of authenticating the target device 18, 20, 22 (block 212 of FIG. 5A) is illustrated in FIG. 5B. FIG. 5B includes a flow diagram of an example method 220 of authenticating a target device to another device or network (e.g., authenticating the target device with another process plant device or network with which the target device desires to safely and securely communicate). In FIG. 5B, authenticating the target device with the other device or network includes requesting a certificate 222 that corresponds to the other device or network, and receiving the requested certificate. Generally, the received certificate attests to the validity of the other device or network with which the target device 18, 20, 22 desires to authenticate. For example, the received certificate may attest to a binding of the other device or network with a key used to encrypt and/or decrypt data (e.g., a public key) by providing a digital signature of the key, and optionally, other information. In some cases, the public key is included in the certificate. A certificate may have been issued to the other device or network by a certificate or certifying authority (CA). The CA may be provided by the process plant 10, may be provided by an enterprise to which the process plant 10 belongs, and/or may be a public CA.

At a block 225, the method 220 includes initializing or initiating a session via which the target device and the other device or network utilize to securely communicate, e.g., a secure or secured session. In an example, initializing the session 225 is performed at a sockets layer or other suitable transport or lower level communications layer between the target device and the other device or network, however, in some cases, initializing the session 225 between the two parties (e.g., the target device 18, 20, 22 and the other device or a node of the network 12, 15) is performed at a communication layer above or below the sockets or transport layer.

In an embodiment, initializing the session 225 between the two parties includes generating a private key 228 for the particular session. Typically, the private key is unique to the particular session and is shared between the target device and the other device or network. In an example, the private key is generated 228 by the target device based on a seed corresponding to data specific to the target device itself, e.g., in a manner such as previously discussed. In some situations, initializing the session 225 includes generating one or more private sub-keys, e.g., in a manner such as previously discussed. Each of the private sub-keys may be unique to the particular session, and one or more of the sub-keys may be shared between the target device and the other device or network node.

Additionally or alternatively, in some situations, initializing the session 225 between the two parties includes determining or establishing one or more encryption techniques or methods 230 that are to be used during the session. For example, the target device determines or establishes the one or more encryption techniques or methods 230 based on the public key indicated by the received certificate, based on the generated private key, and/or based on a generated sub-key. In some situations, a particular technique is used for encryption while a different technique is used for decryption.

It is noted that while in FIG. 5B, initiating the session 225 includes both generating a private key and/or sub-keys 228 and determining encryption technique(s) 230, in some embodiments, one or both of the blocks 228, 230 are omitted. For example, if symmetric key exchange is utilized between the target device and the other device or network, the block 228 is omitted, as only the public key associated with the certificate is exchanged.

At a block 232, the method 200 includes establishing the initialized session between the target device and the other device or between the target device and the network 12, 15 of the process plant, e.g., based on the generated key and/or the determined encryption technique. The session may be a secure or secured session via which data and communications may be securely transmitted and received between the target device and the other device or network 12, 15. In some situations, the secure session may be utilized to manage quality of service (QoS). For example, if multiple different types of data (e.g., process control big data, process control non-big data, mobile control room functions, network management data, etc.) are communicated over the secure session, the session manages QoS of each of the different types of data.

In an example, a session is particular to a user of the target device, e.g., when a particular user utilizes a user interface device 20 (e.g., with a login or other access credentials). Example scenarios in which a user may be secured to a session are provided in aforementioned U.S. patent application Ser. No. 14/028,913 entitled "METHOD FOR INITIATING OR RESUMING A MOBILE CONTROL SESSION IN A PROCESS PLANT" and in U.S. patent application Ser. No. 14/028,921 entitled "METHOD FOR INITIATING OR RESUMING A MOBILE CONTROL SESSION IN A PROCESS PLANT." In these scenarios, a user, via a user interface device 20, is authenticated to a process control network 12, 15 so that a secure session for the user is established for mobile control room applications, e.g., when legacy user control applications and functions (e.g., as supported by the workstations 34 of FIG. 2) are instead supported on mobile computing devices 20. For example, a user establishes a secure session with the process control network 12, 15 using a mobile user interface device 20 (e.g., by logging on or authenticating at the mobile user interface device 20). As user moves about (e.g., as the user moves from one area of the process plant to another so that the mobile device 20 hands-off between network nodes, or as the user moves about at a remote location), the secure session corresponding to the user is maintained so that the user may continuously and seamlessly perform mobile control room tasks. A user may even maintain an established secure session across multiple devices, for example, when the user initially establishes a particular secure session at a stationary work station in a physical control room, and then transfers his or her established particular secure session to a tablet so that the user may enter the process plant field and continue his or her work via the tablet as the user moves about the plant 10.

In another example scenario, the session is secured to a particular device instead of to a process control network, such as described in aforementioned U.S. patent application Ser. No. 13/028,897 entitled "METHOD AND APPARATUS FOR CONTROLLING A PROCESS PLANT WITH LOCATION AWARE MOBILE CONTROL DEVICES," U.S. patent application Ser. No. 14/028,785 entitled "METHOD AND APPARATUS FOR CONTROLLING A PROCESS PLANT WITH LOCATION AWARE MOBILE CONTROL DEVICES," U.S. patent application Ser. No. 14/028,964 entitled "MOBILE CONTROL ROOM WITH REAL-TIME ENVIRONMENT AWARENESS," and U.S. patent application Ser. No. 14/028,923 entitled "METHOD AND APPARATUS FOR DETERMINING THE POSI- TION OF A MOBILE CONTROL DEVICE IN A PROCESS PLANT." For example, a mobile diagnostic device (which may be a user interface device 20 or other device 22) moves into a region proximate to a field device, and based on the proximity of the devices, establishes a secure session with the field device to receive data from the field device to use in diagnostics, e.g., via a user interface application or via an unsupervised application. After the data has been transferred, the secure session may be safely and securely terminated, and the mobile diagnostic device may be moved proximate to a different field device to collect data from the different field device. In another example, a field device is authenticated to a centralized and/or distributed big data appliance of the process plant or to a big data appliance of an enterprise of the process plant so that the field device may securely stream big data for historization.

Returning to block 212 of FIG. 5A and attempting device authentication, of course, using certificates and keys as described above for the method 220 is only one of many techniques which may be used to authenticate the device 18, 20, 22 with another device or with at least one of the process control networks 12, 15. Other suitable techniques for device authentication (block 212) may be alternatively or additionally used.

Continuing on to block 215, if the authentication of the device 18, 20, 22 is successful, then the device 18, 20, 22 is considered as secured and authenticated to the process plant 10 and, accordingly, may proceed to operate in real-time within the process plant 10 while the plant 10 is operating to control a process (block 208). In embodiments in which the secured device 18, 20, 22 is secured to the process plant network 12, 15, the secured device 18, 20, 22 maintains its secured status while communicating across and between different nodes of the network 12, 15. For example, if the secured device 18, 20, 22 is a mobile device, the secured mobile device may move within the process plant and hand-off communications from one node of the network 12, 15 to another node of the network 12, 15 using the same secured session.

In an embodiment, a successfully authenticated device 18, 20, 22 encrypts (block 218) some or all communications to the other device or to the network 12, 15 of the plant 10 with which the device 18, 20, 22 has been successfully authenticated. For example, the authenticated device 18, 20, 22 encrypts process control data (and, in some cases, also encrypts non-process control data or all transmitted data) using the one or more encryption techniques or methods determined at the block 230 of FIG. 5B.

Moreover, for authenticated devices 18, 20, 22 that utilize communication protocols that verify or validate the content of messages communicated therewith, the method 200 provides an additional layer or degree of security. To illustrate, consider an example device 18, 20, 22 that communicates with another device or node of the network 12, 15 using a protocol that includes a checksum or other message content integrity code to validate or verify the contents of each message or of a group of messages. For instance, the example device 18, 20, 22 may communicate (at least in part) using the WirelessHART protocol, which allows for messages to include a Message Integrity Code (MIC) field by which message contents are verified, validated or secured. Accordingly, for such a device 18, 20, 22, not only is the device 18, 20, 22 itself secured to the other device or network 12, 15 (e.g., via the method 200 and/or the method 220), but also messages transmitted by the secured device 18, 20, 22 may themselves be secured. In an example, encryption of communications to/from the secured device 18, 20, 22 (block 218) results in encryption of the checksums or message integrity codes included in said communications. That is, both the device itself and messages transmitted by the device are encrypted based on the same key (e.g., the private key generated at the block 228). In another example, the device itself and the messages transmitted by the device are encrypted based on different keys. For instance, the device itself may be secured by a public or a private key, while the content of messages transmitted by the device may be secured by a private sub-key, e.g., a message including the checksum or message integrity code may be particularly encrypted based on a private sub-key. In any case, for authenticated devices 18, 20, 22 that utilize communication protocols structured to verify or validate message content, the method 200 may provide multiple layers or levels of security, e.g., the security, validation or verification of the device 18, 20, 22 itself, as well as the security, validation or verification of the contents of messages transmitted by the device 18, 20, 22.

Returning now to block 215 of FIG. 5A, when the authentication of the device 18, 20, 22 is unsuccessful, the device 18, 20, 22 remains isolated from any of the process control networks 12, 15 and/or from the other device (block 210), e.g., as previously discussed. If the device 18, 20, 22 includes an integral user interface, the device 18, 20, 22 may indicate its unsuccessful authentication thereon. Additionally or alternatively, the device 18, 20, 22 may indicate its unsuccessful authentication via a network that is not communicatively connected to the process control networks 12, 15, such as a cellular communications network.

In some embodiments of the method 200 of securing devices with a process plant, the message content level of security is utilized without authenticating the device, e.g., the blocks 212, 215 are omitted. In such embodiments, a device 18, 20, 22 does not authenticate to another device or network 12, 15 (e.g., does not establish a secure session at a sockets layer), but instead utilizes the indications of necessary conditions stored at the device 18, 20, 22 to encrypt messages, communications, or portions thereof that are transmitted by the device 18, 20, 22. For instance, a key (and in some cases, one or more sub-keys) is provisioned into the device 18, 20, 22, where the key/sub-keys are based on data indicative of a set of necessary conditions and/or attributes that are necessary in order for the device 18, 20, 22 to communicate with the process plant 10, e.g., in a manner such as previously discussed. The provisioned key or sub-key is utilized by the device 18, 20, 22 as the basis for the encryption of some or all messages transmitted by the device 18, 20, 22 to the process plant 10. Accordingly, a checksum or other suitable message content integrity code (e.g., that is included in a message transmitted by the device 18, 20, 22 and that is used to validate the contents of a particular message transmitted by the device 18, 20, 22) is encrypted using an encryption technique based on the provisioned key or sub-key. As such, message level security is provided without providing device level authentication. Such message level security techniques are particularly suited to secure lower-level devices, such as smart field devices and other types of hardware provider devices 18.

With further regard to the method 200 of FIG. 5A and the method 220 of FIG. 5B, some or all of the techniques for securing devices to another device or to a process control network are easily applied to safely and gracefully terminating communications between a previously-secured device from the other device or from the process control network. For example, a secured device may be safely and gracefully divorced from the other device or from the process control network to which the device has been secured when the device needs to be temporarily taken off-line for maintenance or transfer for use in another location, or when the secured device is to be permanently decommissioned from service. Such safe terminations of secure devices may be active or passive. For example, to actively terminate the access of a secured device, a certificate used to authenticate the device may be revoked, e.g., by the CA. To passively terminate the access of a secured device, the secured device may isolate itself (block 210) when current conditions and/or attributes (e.g., as determined at the block 202 of FIG. 5A) no longer meet necessary conditions and/or attributes. For example, a device may be configured with attributes that govern a key to be valid for only a predefined time period.

Figure 6:
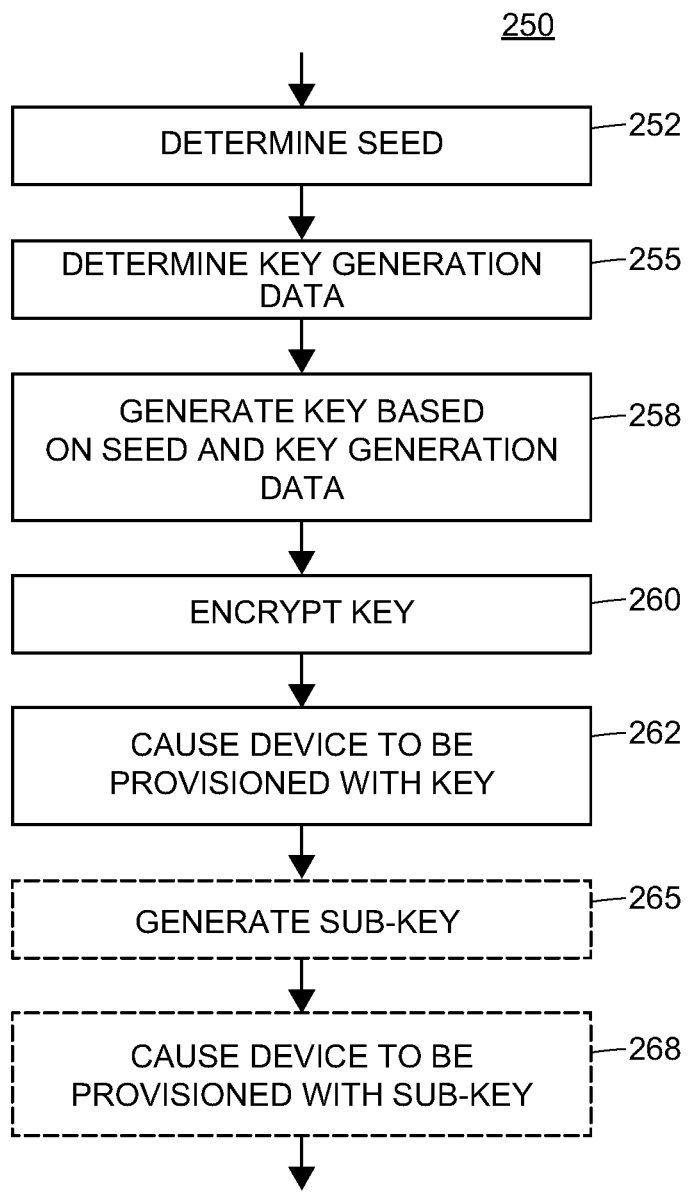
FIG. 6 is a flow diagram of an example method for securing a device in a process control system or plant.

Turning now to FIG. 6, FIG. 6 depicts an example method 250 for securing a device for use with a process plant, e.g., for securing one of the devices 18, 20, 22 of FIG. 1. For example, the example method 250 may be used to secure a process control device or a user interface device that is intended for use with a process plant and, as such, may access one or more networks of the process plant. In an embodiment, a computing device includes a memory storing instructions thereon that, when executed by a processor, cause the computing device to perform at least some portion of the method 250. Further, in some cases, the method 250 may be executed in conjunction with the method 200 of FIG. 5A and/or with the method 220 of FIG. 5B. For ease of discussion, the method 250 is discussed below with simultaneous reference to FIGS. 1-5A and 5B, although this discussion is not limiting.

At block 252, the method 250 includes determining a seed that is used to generate a key for use by the device that is desired to be secured, e.g., a target device such as one of the devices 18, 20, 22. The seed includes a number, which may be a randomly generated number or pseudo-randomly generated number of any desired length. Additionally or alternatively, the seed may include a number that is indicative of an identification of the device, such as a HART or WirelessHART Device Type and/or Device ID number.

At block 255, the method 250 includes determining key generation data. As previously discussed, key generation data is indicative of a set of necessary conditions that must be met before the device is allowed to access a process control network, e.g., before the device is secured to the process control network. That is, the set of necessary conditions must be met before the device is allowed to be configured for its particular use in the process plant, before the device is allowed to operate in conjunction with the process plant while the process plant is operating in real-time to control a process, and/or before the device is allowed to communicate with any node of the process control network included in the process plant. The set of necessary conditions may indicate attributes or characteristics of an environment in which the device is located for the purposes of operating in conjunction with the process plant. Additionally or alternatively, the set of necessary conditions may indicate attributes of the device itself that are independent of the location or environment of the device.

The method 250 further includes generating the key from the seed and the key generation data (block 258). For example, as previously discussed, the seed and the key generation data may be combined into an integral unit or string, and a key generation algorithm is applied to the integral unit or string to generate the key. In some embodiments, the method 250 includes encrypting the initially unencrypted, generated key to form an encrypted key (block 260). The blocks 258 and 260 may be separately executed, or may be integrally executed as desired. In some cases, the block 260 is omitted and, in these cases, the key that was initially generated (block 258) remains unencrypted.

At block 262, the method 250 includes causing the device to be provisioned with the key (which may be unencrypted or encrypted), e.g., so that the key is stored in a non-volatile memory of the device. Provisioning the device with the generated key (block 262) may be performed at any time prior to the device being configured for its particular use in the process plant, before the device is allowed to operate in conjunction with the process plant while the process plant is operating in real-time to control a process (e.g., by transmitting and/or receiving real-time data that causes the process to be controlled), and/or before the device is allowed to communicate with any node of the process control network included in the process plant. For example, the device may be provisioned by a device supplier, a device manufacturer, or by a process control system provider, e.g., at a staging area of the process plant in which the device is to operate. Further, provisioning the device with the generated key (block 262) may be performed using any desired or known provisioning technique, such as storing the key into the device memory at time of manufacture, storing the key into the device memory using a tool, or storing the key after a certificate exchange.

At an optional block 265, the method 250 includes generating a sub-key associated with the key. In an embodiment, generating the sub-key associated with the key (block 265) includes determining a seed used to generate the sub-key (which may or may not be the same seed that was used to generate the key with which the sub-key is associated), and includes determining sub-key generation data (which typically, but not necessarily, differs from the key generation data). The sub-key seed and sub-key generation data may be combined, and the sub-key may be generated from said combination, e.g., by using any desired key generation technique. If desired, the initially generated sub-key may be encrypted.

At a further optional block 268, the generated sub-key (whether unencrypted or encrypted) is caused to be provisioned into the device. Provisioning the device with the sub-key (block 268) may be performed in a manner similar to that discussed for provisioning the device with the key (block 260).

Figure 7:
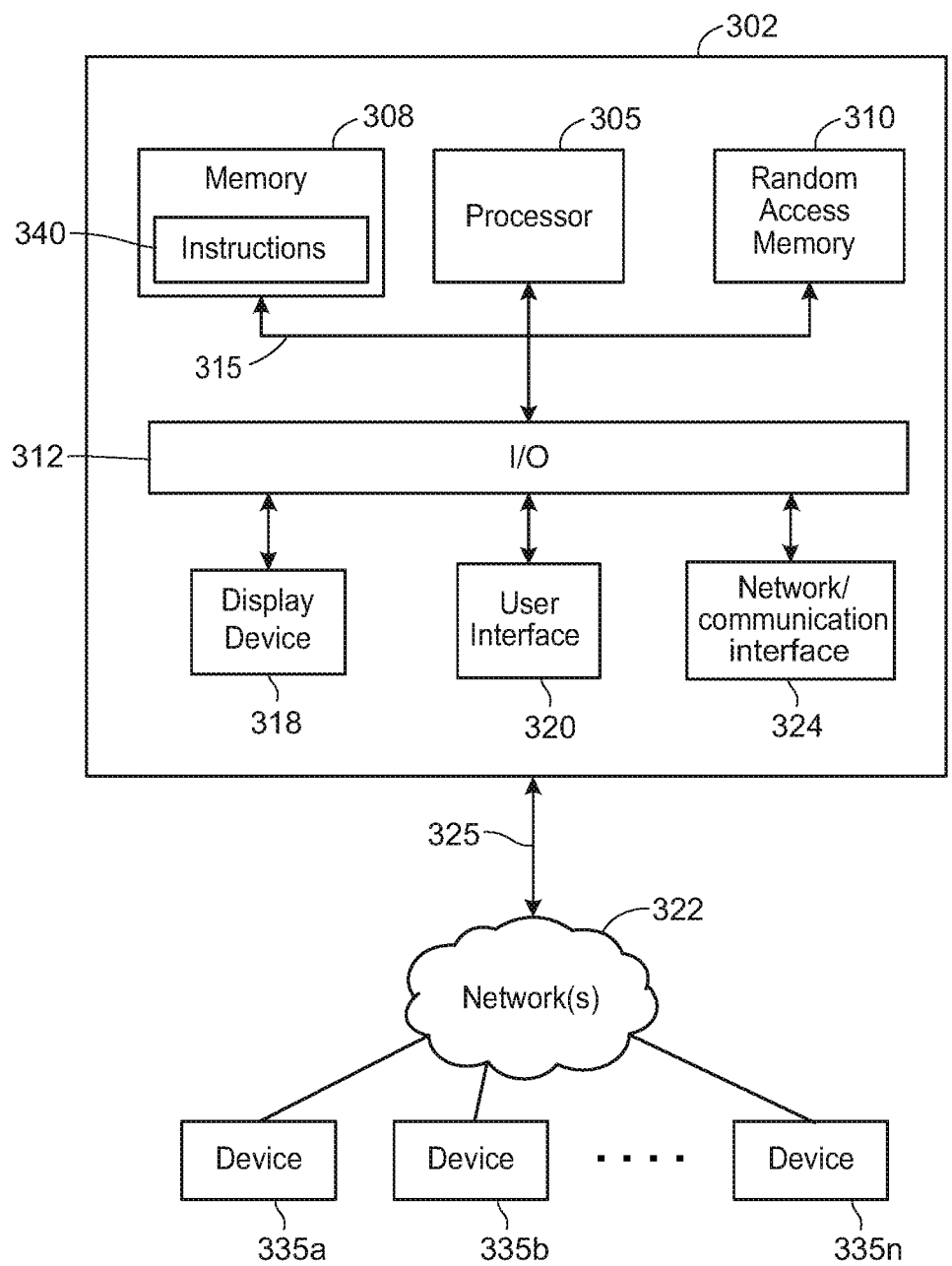
FIG. 7 is a block diagram of an example device that may be utilized in or in conjunction with a process control system or plant.

FIG. 7 illustrates a simplified block diagram of a computing device 302 that may be included in the any of the devices 18, 20, 22 of FIG. 1, or that may be utilized in conjunction with the process plant 10. Although the device 302 is illustrated as being a computing device, the principles discussed with respect to the device 302 may apply equally to other devices that may support the techniques, methods, and systems of the present disclosure, including, but not limited to, process controllers, I/O cards, smart field devices, routers, access points, gateways, process plant big data nodes, cellular telephones, smart phones, and tablets, to name a few. In an example, the device 302 performs at least part of the method 200. In an example, the device 302 performs at least part of the method 250.

The computing device 302 may include a processor 305 (may be called a microcontroller or a microprocessor, in some embodiments) for executing computer executable instructions and a program or non-volatile memory 308 for permanently storing data related to the computer executable instructions. For example, if the device 302 is one of the devices 18, 20, 22, the non-volatile memory 308 stores a key, and the non-volatile memory 308 may store zero or more sub-keys.

The device 302 additionally includes a random-access memory (RAM) 310 for temporarily storing data related to the computer executable instructions, and an input/output (I/O) circuit 312, all of which may be interconnected via an address/data bus 315.

It should be appreciated that although only one processor 305 is shown, the computing device 302 may include multiple processors 305. Similarly, the memory of the computing device 302 may include multiple RAMs 310 and multiple program or non-volatile memories 308. The RAM(s) 310 and program memories 308 may be implemented as one or more semiconductor memories, magnetically readable memories, optically readable memories, biological memories, and/or other tangible, non-transitory computer-readable storage media, for example. Additionally, although the I/O circuit 312 is shown as a single block, it should be appreciated that the I/O circuit 312 may include a number of different types of I/O circuits. For example, a first I/O circuit may correspond to a display device 318, and the first or a second I/O circuit may correspond to a user interface 320. The user interface 320 may be, for example, a keyboard, a mouse, a touch screen, a voice activation device, and/or any other known user interface device. In some embodiments, the display device 318 and the user interface 320 may be jointly incorporated in a single physical device. In some embodiments, the computing device 302 excludes a display device 318 and/or excludes a user interface 320, e.g., when the computing device 302 is implemented in certain types of process control devices. In some embodiments, the computing device 302 includes other elements common to general purpose computing devices.

The computing device 302 includes one or more network or communication interfaces 324 to one or more links 325 via which the device 302 may connect to one or more networks 322 (e.g., one or more of the process control networks 12, 15 of FIG. 1). In some embodiments, different communication interfaces 324 utilize different communication protocols. The link 325 may be as simple as a memory access function or network connection, and/or the link 325 may be a wired, wireless, or multi-stage connection. Many types of links are known in the art of networking and may be used in conjunction with the computing device 302. In some embodiments, at least one of display device 318 or the user interface 320 may be remotely connected to the computing device 302 using the network 322 and the link 325.

Further, the computing device 302 may be in communicative connection with a plurality of other devices 335a-335n via the one or more networks 322. The other devices 335a-335n may include, for example, one or more of the devices 18, 20, 22 of FIG. 1. Although not illustrated, the other devices 335a-335n may each also include elements typically found in general computing devices and similar to the computing device 302, such as a memory, a processor, a RAM, a bus, a display, a user interface, a network interface, and other elements.

Still further, the computing device 302 may include one or more sets of computer executable instructions 340 stored thereon. As used herein, the terms "computer-executable instructions," "computer executable instructions," and "instructions" are used interchangeably. The instructions 340 may be stored on the memory 308 and executable by the processor 305 to perform any portion of the methods described herein, e.g., the method 200 of FIG. 5A, the method 220 of FIG. 5B, and/or the method 250 of FIG. 6.

Embodiments of the techniques described in the present disclosure may include any number of the following aspects, either alone or combination:

1. A process control device for use in a process control plant, the process control device comprising: a processor; a non-volatile memory storing data indicative of a set of necessary attributes that are required for the process control device to be allowed to communicate with another device using a network of the process control plant, where the set of necessary attributes is descriptive of an environment in which the process control device is allowed to communicate with the another device; and computer-executable instructions stored on the non-volatile memory or on another memory of the process control device. The computer-executable instructions may be executable by the processor after a boot up of the process control device and prior to the process control device communicating with any other device to at least one of: (i) configure the process control device, or (ii) at least one of transmit or receive data used to control a process in the process control plant. In particular, the computer-executable instructions, when executed by the processor, may cause the process control device to determine a set of current attributes of a current environment in which the process control device is located after the boot up; determine, based on the data indicative of the set of necessary attributes, whether or not a set of current attributes of a current environment in which the process control device is located adheres to the set of necessary attributes; when the set of current attributes adheres to the set of necessary attributes, allow the process control device to communicate with the another device to at least one of: (i) configure the process control device, or (ii) at least one of transmit or receive real-time data to cause the process to be controlled; and when the set of current attributes does not adhere to the set of necessary attributes, prevent the process control device from communicating with the another device to at least one of: (i) configure the process control device, or (ii) at least one of transmit or receive the real-time data to cause the process to be controlled.

2. The process control device according to aspect 1, further comprising a geo-spatial receiver, wherein the computer-executable instructions are further executable by the processor to cause the process control device to determine, using the geo-spatial receiver, a current geo-spatial position of process control device, and wherein the set of necessary attributes corresponding to the environment in which the process control device is located includes a particular geo-spatial area.

3. The process control device according to either aspect 1 or aspect 2, wherein the computer-executable instructions are further executable to cause the process control device to determine a current time, and the set of necessary attributes corresponding to the environment in which the process control device is located further include a particular time interval corresponding to the particular geo-spatial area.

4. The process control device according to any one of aspects 1 to 3, wherein the non-volatile memory is provisioned with a key for use for use in authenticating the process control device to the network of the process control plant, the key is generated based on a seed, the seed comprises key generation data and a number that is randomly generated or pseudo-randomly generated, and the key generation data is indicative of the set of necessary attributes that are required for the process control device to be allowed to communicate with the another device using the network of the process control plant.

5. The process control device according to aspect 4, wherein the key provisioned into the non-volatile memory of the process control device is an encrypted key, the encrypted key is generated by encrypting an unencrypted key, and the seed is used to generate the unencrypted key.

6. The process control device according to either aspect 4 or aspect 5, further comprising additional computer executable instructions that, when executed by the processor, cause the process control device to authenticate with the another device or with a certificate authority using the key provisioned into the non-volatile memory after the set of current attributes have been determined to adhere to the set of necessary attributes and prior to the process control device communicating with the another device to at least one of: (i) configure the device, or (ii) at least one of transmit or receive the real-time data to cause the process to be controlled.

7. The process control device according to any one of the previous aspects, wherein at least a portion of the transmitted or received real-time data is included in a content of a message, and wherein data included in a message integrity field of the message to validate the content of the message is based on the key or is based on a sub-key generated based on the key.

8. The process control device according to any one of the previous aspects, wherein the set of necessary attributes includes at least one of: a type of data transmitted by the process control device to control the process, a type of data received by the process control device to control the process, a manufacturer of the process control device, an identification of the process control plant, an identification of an area of the process control plant, an identification of an organizational entity operating the process control plant, or an identification of a country in which the process control plant is located.

9. The process control device according to aspect 8, wherein the set of necessary attributes further includes an attribute of a user.

10. The process control device according to any one of the previous aspects, wherein the process control device is one of: a process controller, a field device, or an input/output (I/O) card in connection with the process controller.

11. The process control device according to any one of the previous aspects, further comprising an interface communicatively connecting the process control device to a centralized or distributed big data appliance, and wherein the process control device provides the real-time data to the centralized or distributed big data appliance.

12. A method for securing devices in a process control plant, the method comprising: determining, at a computing device, a seed used to generate a key, where the seed is at least partially based on a number that is randomly generated or pseudo-randomly generated; determining, at the computing device, key generation data, wherein: the key generation data is indicative of a set of necessary conditions that are required for a host device that is provisioned with the key to communicate using a network of the process control plant to at least one of: (i) configure the host device, (ii) transmit real-time data to cause a process to be controlled in the process control plant, or (iii) receive real-time data to cause the process to be controlled, and the set of necessary conditions corresponds to an environment in which the host device is able to be located; generating, at the computing device, the key from the seed and the key generation data; and causing, by the computing device, a process control device to be provisioned with the generated key so that the provisioned process control device is the host device, and so that the provisioned process control device authenticates to the network using the generated key and based on a comparison of the set of necessary conditions and a set of current conditions corresponding to a current environment in which the provisioned process control device is located upon boot-up.

13. The method according to aspect 12, wherein determining the seed used to generate the key comprises determining the seed further based on an identification of the process control device.

14. The method according to either one of aspect 12 or aspect 13, wherein causing the process control device to be provisioned with the generated key comprises causing the generated key to be stored in a non-volatile memory of the process control device prior to the process control device communicating with any other device to at least one of: (i) configure the process control device, (ii) transmit real-time data to cause the process to be controlled, or (iii) receive real-time data to cause the process to be controlled.

15. The method according to any one of aspects 12-14, wherein the set of necessary conditions includes at least one of: a geo-spatial location of the host device, a specific time, a specific time interval, a specific date or range of dates, or a specific area of the process control plant.

16. The method according to any one of aspects 12-15, wherein the set of necessary conditions includes at least one of: a type of real-time data transmitted by the host device, a type of real-time data received by the host device, or a manufacturer of the host device.

17. The method according to any one of aspects 12-16, wherein the set of necessary conditions includes at least one of: an identity of the process control plant, an identity of an organizational entity operating the process control plant, or an identity of a country in which the process control plant is located.

18. The method according to any one of aspects 12-17, wherein the computing device is a first computing device, the key is a first key, the seed is a first seed, the key generation data is first key generation data, the set of conditions is a first set of necessary conditions, the host device is a first host device, and the process control device is a first process control device; and wherein the method further comprises determining a second seed to generate a second key, the second seed based on second key generation data indicative of a second set of necessary conditions that are required for a second host device to communicate via the network of the process control plant; generating the second key from the second seed; and causing a second device to be provisioned with the second key so that the second device is the second host device, and so that the provisioned second device authenticates to the network using the generated second key and based on a comparison of the second set of necessary conditions and a set of current conditions corresponding to a current environment in which the provisioned second device is located upon boot-up; and the provisioned second device is a second process control device or a second computing device.

19. A device for use in a process control plant, the device comprising: a processor; and a non-volatile memory storing a key and a sub-key derived from the key, wherein the key is generated at least in part based on key generation data that is indicative of a first set of necessary conditions that are required for a host device that is provisioned with the key to communicate with a network of the process control plant, wherein the first set of necessary conditions correspond to an environment in which the host device is able to be located, the sub-key is generated at least in part based on sub-key generation data that is indicative of a second set of necessary conditions that are required for the host device that is provisioned with the sub-key to communicate with the network of the process control plant, and the second set of necessary conditions corresponding to the environment in which the host device is able to be located. The device further comprises computer-executable instructions stored on the non-volatile memory or another memory of the device, the computer-executable instructions executable by a processor to cause the device to: determine, based on the key or the sub-key, whether or not a set of current conditions of a current environment in which the device is located adheres to the respective set of necessary conditions; when the set of current conditions adheres to the respective set of necessary conditions, allow the device to communicate with another device of the process control plant to at least one of: (i) configure the device, or (ii) at least one of transmit or receive real-time data generated by controlling a process; and when the set of current conditions does not adhere to the respective set of necessary conditions, prevent the process control device from communicating with the another device of the process control plant to at least one of: (i) configure the device, or (ii) at least one of transmit or receive the real-time data generated by controlling the process.

20. The device according to aspect 19, wherein the another device is a node in at least one network included in the process control plant.

21. The device according to either one of aspect 19 or aspect 20, further comprising additional computer-executable instructions that, when executed by the processor, cause the device to determine the set of current conditions of the current environment in which the device is located.

22. The device according to any one of aspects 19-21, further comprising additional computer-executable instructions that, when executed by the processor, cause the device to authenticate with the another device or with a certificate authority using the key or the sub-key prior to the device communicating with the another device of the process control plant to at least one of: (i) configure the device, or (ii) at least one of transmit or receive the real-time data generated by controlling the process.

23. The device according to any one of aspects 19-22, further comprising additional computer-executable instructions that, when executed by the processor, cause the device to establish a session for communicating between the device and the another device to at least one of: (i) configure the device, or (ii) at least one of transmit or receive the real-time data generated by controlling the process, and wherein at least one of the key or the sub-key is unique to the session.

24. The device according to aspect 23, wherein the session corresponds to the another device or to a network of which the another device is a node.

25. The device according to any one of aspects 19-24, wherein at least one of the first set of necessary conditions or the second set of necessary conditions includes at least one of: a geo-spatial location, a specific time, a specific time interval, a date, or an area of the process control plant.

26. The device according to any one of aspects 19-25, wherein at least one of the first set of necessary conditions or the second set of necessary conditions includes at least one of: a type of data transmitted by the device to control the process, a type of data received by the device to control the process, or a manufacturer of the device.

27. The device according to any one of aspects 19-26, wherein at least one of the first set of necessary conditions or the second set of necessary conditions includes at least one of: an identification of the process control plant, an identification of an area of the process control plant, an identification of an organizational entity operating the process control plant, or an identification of a country in which the process control plant is located.

28. The device according to any one of aspects 19-27, wherein at least one of the first set of necessary conditions or the second set of necessary conditions includes an attribute of a user of the device.

29. The device according to any one of aspects 19-28, wherein the device is one of: a process controller, a field device, or an input/output (I/O) card in connection with the process controller.

30. The device according to any one of aspects 19-28, wherein the device is a computing device configured to at least one of transmit or receive data corresponding to at least one of: a process controller, a field device, or an input/output (I/O) card in connection with the process controller.

31. The device according to any one of aspects 19-28, wherein the device is a mobile computing device including a user interface, and wherein a mobile control room application executes on the mobile computing device.

32. The device according to any one of aspects 19-31, wherein at least one member of the first set of necessary conditions is defined by a provider of the device, and wherein at least one member of the second set of necessary conditions is defined by a user of the device.

33. The device according to any one of aspects 19-32, wherein the real-time data generated by controlling the process and transmitted or received by the device is encrypted.

34. The device according to any one of aspects 19-33, wherein all data transmitted by the device is encrypted.

35. The device according to one of aspect 33 or aspect 34, wherein the data encryption is based at least in part on one of the key or the sub-key.

36. Any one of the previous aspects in combination with any other one of the previous aspects.

Additionally, the previous aspects of the disclosure are exemplary only and not intended to limit the scope of the disclosure.

The following additional considerations apply to the foregoing discussion. Throughout this specification, actions described as performed by any device or routine (e.g., an action included in the method 200, 220, and/or 250) generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device), such as illustrated in FIG. 7. The instructions, when executed by one or more processors of a corresponding device (e.g., a server, a mobile device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method for securing devices in a process control plant, the method comprising:
    determining, at a computing device, a seed used to generate a key, the seed at least partially based on a number that is randomly generated or pseudo-randomly generated;
    determining, at the computing device, key generation data, wherein:
        the key generation data is indicative of a set of necessary conditions that are required for a host device that is provisioned with the key to communicate using a network of the process control plant to at least one of: (i) configure the host device, (ii) transmit real-time data to cause a process to be controlled in the process control plant, or (iii) receive real-time data to cause the process to be controlled, and
        the set of necessary conditions includes one or more characteristics of an environment in which the host device is able to be located;
    generating, at the computing device, the key from the seed and the key generation data; and
    causing, by the computing device, a process control device to be provisioned with the generated key so that the provisioned process control device is the host device, and so that the provisioned process control device authenticates to the network using the generated key and based on a comparison of the set of necessary conditions and a set of current conditions corresponding to a current environment in which the provisioned process control device is located upon boot-up.

2. The method of claim 1, wherein determining the seed used to generate the key comprises determining the seed further based on an identification of the process control device.

3. The method of claim 1, wherein causing the process control device to be provisioned with the generated key comprises causing the generated key to be stored in a non-volatile memory of the process control device prior to the process control device communicating with any other device to at least one of: (i) configure the process control device, (ii) transmit real-time data to cause the process to be controlled, or (iii) receive real-time data to cause the process to be controlled.

4. The method of claim 1, wherein the set of necessary conditions includes at least one of: a geo-spatial location of the host device, a specific time, a specific time interval, a specific date or range of dates, or a specific area of the process control plant.

5. The method of claim 1, wherein the set of necessary conditions includes at least one of: a type of real-time data transmitted by the host device, a type of real-time data received by the host device, or a manufacturer of the host device.

6. The method of claim 1, wherein the set of necessary conditions includes at least one of: an identity of the process control plant, an identity of an organizational entity operating the process control plant, or an identity of a country in which the process control plant is located.

7. The method of claim 1, wherein:
    the computing device is a first computing device, the key is a first key, the seed is a first seed, the key generation data is first key generation data, the set of conditions is a first set of necessary conditions, the host device is a first host device, and the process control device is a first process control device;
    the method further comprises:
        determining a second seed to generate a second key, the second seed based on second key generation data indicative of a second set of necessary conditions that are required for a second host device to communicate via the network of the process control plant;
        generating the second key from the second seed; and
        causing a second device to be provisioned with the second key so that the second device is the second host device, and so that the provisioned second device authenticates to the network using the generated second key and based on a comparison of the second set of necessary conditions and a set of current conditions corresponding to a current environment in which the provisioned second device is located upon boot-up; and the provisioned second device is a second process control device or a second computing device.

8. A device for use in a process control plant, the device comprising:
a processor;
a non-volatile memory storing a key and a sub-key derived from the key, wherein:
the key is generated at least in part based on key generation data that is indicative of a first set of necessary conditions that are required for a host device that is provisioned with the key to communicate with a network of the process control plant, the first set of necessary conditions corresponding to an environment in which the host device is able to be located, and
the sub-key is generated at least in part based on sub-key generation data that is indicative of a second set of necessary conditions that are required for the host device that is provisioned with the sub-key to communicate with the network of the process control plant, the second set of necessary conditions corresponding to the environment in which the host device is able to be located; and
computer-executable instructions stored on the non-volatile memory or another memory of the device, the computer-executable instructions executable by a processor to cause the device to:
determine, based on the key or the sub-key, whether or not a set of current conditions of a current environment in which the device is located adheres to the respective set of necessary conditions;
when the set of current conditions adheres to the respective set of necessary conditions, allow the device to communicate with another device of the process control plant to at least one of: (i) configure the device, or (ii) at least one of transmit or receive real-time data generated by controlling a process, and
when the set of current conditions does not adhere to the respective set of necessary conditions, prevent the process control device from communicating with the another device of the process control plant to at least one of: (i) configure the device, or (ii) at least one of transmit or receive the real-time data generated by controlling the process.

9. The device of claim 8, wherein the another device is a node in at least one network included in the process control plant.

10. The device of claim 8, further comprising additional computer-executable instructions that, when executed by the processor, cause the device to determine the set of current conditions of the current environment in which the device is located.

11. The device of claim 8, further comprising additional computer-executable instructions that, when executed by the processor, cause the device to authenticate with the another device or with a certificate authority using the key or the sub-key prior to the device communicating with the another device of the process control plant to at least one of: (i) configure the device, or (ii) at least one of transmit or receive the real-time data generated by controlling the process.

12. The device of claim 8, further comprising additional computer-executable instructions that, when executed by the processor, cause the device to establish a session for communicating between the device and the another device to at least one of: (i) configure the device, or (ii) at least one of transmit or receive the real-time data generated by controlling the process, and wherein at least one of the key or the sub-key is unique to the session.

13. The device of claim 12, wherein the session corresponds to the another device or to a network of which the another device is a node.

14. The device of claim 8, wherein at least one of the first set of necessary conditions or the second set of necessary conditions includes at least one of: a geo-spatial location, a specific time, a specific time interval, a date, or an area of the process control plant.

15. The device of claim 8, wherein at least one of the first set of necessary conditions or the second set of necessary conditions includes at least one of: a type of data transmitted by the device to control the process, a type of data received by the device to control the process, or a manufacturer of the device.

16. The device of claim 8, wherein at least one of the first set of necessary conditions or the second set of necessary conditions includes at least one of: an identification of the process control plant, an identification of an area of the process control plant, an identification of an organizational entity operating the process control plant, or an identification of a country in which the process control plant is located.

17. The device of claim 8, wherein at least one of the first set of necessary conditions or the second set of necessary conditions includes an attribute of a user of the device.

18. The device of claim 8, wherein the device is one of: a process controller, a field device, or an input/output (I/O) card in connection with the process controller.

19. The device of claim 8, wherein the device is a computing device configured to at least one of transmit or receive data corresponding to at least one of: a process controller, a field device, or an input/output (I/O) card in connection with the process controller.

20. The device of claim 8, wherein the device is a mobile computing device including a user interface, and wherein a mobile control room application executes on the mobile computing device.

21. The device of claim 8, wherein at least one member of the first set of necessary conditions is defined by a provider of the device, and wherein at least one member of the second set of necessary conditions is defined by a user of the device.

22. The device of claim 8, wherein the real-time data generated by controlling the process and transmitted or received by the device is encrypted.

23. The device of claim 22, wherein the real-time data is encrypted based on one of the key or the sub-key.

24. The device of claim 22, wherein all data is transmitted by the device is encrypted at least in part based on the key or the sub-key.

25. The device of claim 8, wherein all data transmitted by the device is encrypted.

* * * * *